US011442186B2

(12) United States Patent
Deschizeaux et al.

(10) Patent No.: US 11,442,186 B2
(45) Date of Patent: Sep. 13, 2022

(54) SOURCE-RECEIVER POSITION ESTIMATION USING DIRECT ARRIVAL MODELING AND INVERSION

(71) Applicant: CGG SERVICES SAS, Massy (FR)

(72) Inventors: Bernard Deschizeaux, Antony (FR); Vetle Vinje, Oslo (NO); Carl-Inge Nilsen, Oslo (NO)

(73) Assignee: SERCEL SAS, Carquefou (FR)

( * ) Notice: Subject to any disclaimer, the term of this patent is extended or adjusted under 35 U.S.C. 154(b) by 96 days.

(21) Appl. No.: 16/633,787

(22) PCT Filed: Aug. 29, 2018

(86) PCT No.: PCT/IB2018/001090
§ 371 (c)(1),
(2) Date: Jan. 24, 2020

(87) PCT Pub. No.: WO2019/043452
PCT Pub. Date: Mar. 7, 2019

(65) Prior Publication Data
US 2021/0080604 A1 Mar. 18, 2021

Related U.S. Application Data

(60) Provisional application No. 62/552,798, filed on Aug. 31, 2017.

(51) Int. Cl.
G01V 1/28 (2006.01)
(52) U.S. Cl.
CPC .......... *G01V 1/282* (2013.01); *G01V 2210/67* (2013.01)
(58) Field of Classification Search
CPC .. G01V 1/282; G01V 2210/67; G01V 1/3817; G01V 1/364; G01V 1/366
(Continued)

(56) References Cited

U.S. PATENT DOCUMENTS 5,757,722 A 5/1998 Zinn
2009/0296519 A1 12/2009 Keers et al.
(Continued)

FOREIGN PATENT DOCUMENTS

WO 2015140644 A2 9/2015
WO 2016083892 A2 6/2016

OTHER PUBLICATIONS

Rick Aster, "Seismic Wave Equation", Feb. 15, 2011. (Year: 2011).*
(Continued)

*Primary Examiner* — Michael P Nghiem
(74) *Attorney, Agent, or Firm* — Patent Portfolio Builders PLLC

(57) ABSTRACT

A method for correcting physical positions of seismic sensors and/or seismic sources for a seismic data acquisition system. The method includes estimating a respective energy generated by each source element, which belongs to a source array; calculating a respective energy recorded by each individual seismic sensor, which belongs to a composite receiver; summing, for each individual seismic sensor, all the generated energies from the all the source elements; estimating a model of direct arrival waves that propagate from the source elements to the individual seismic sensors; calculating positions of the individual seismic sensors based on the model of direct arrival waves; comparing calculated positions of the individual seismic sensors with observed positions of the individual seismic sensors; selecting a best calculated position for each of the individual seismic sensors based on an objective function; and correcting the observed positions of the individual seismic sensors with corresponding best calculated positions.

19 Claims, 18 Drawing Sheets

(58) Field of Classification Search
USPC .......................................................... 702/14
See application file for complete search history.

(56) References Cited

U.S. PATENT DOCUMENTS

| | | | |
|---|---|---|---|
| 2012/0195163 A1 | 8/2012 | Groenaas et al. | |
| 2013/0077440 A1* | 3/2013 | Cao .......................... | G01V 1/28 367/73 |
| 2016/0334523 A1* | 11/2016 | Edme ....................... | G01V 1/20 |
| 2017/0017005 A1 | 1/2017 | Siliqi et al. | |
| 2017/0017006 A1* | 1/2017 | Noss ..................... | G01V 1/3852 |
| 2017/0212260 A1* | 7/2017 | Padhi ..................... | G01V 1/306 |
| 2017/0219732 A1* | 8/2017 | Poole ..................... | G01V 1/282 |
| 2017/0371070 A1* | 12/2017 | Teyssandier ........... | G01V 13/00 |
| 2019/0170889 A1* | 6/2019 | Hampson ............. | G01V 1/3835 |

OTHER PUBLICATIONS

International Search Report / Written Opinion of the International Searching Authority in related/corresponding PCT Application No. PCT/IB2018/001090 dated Dec. 20, 2018.
Examination Report in related/corresponding European Application No. 18 780 214.5 dated Mar. 22, 2022.

* cited by examiner

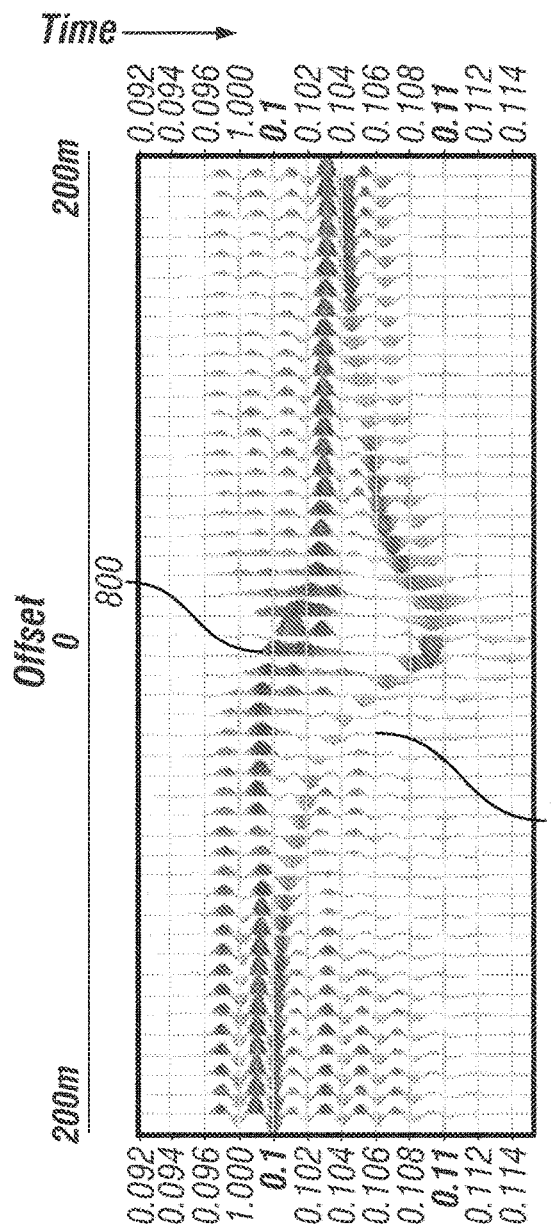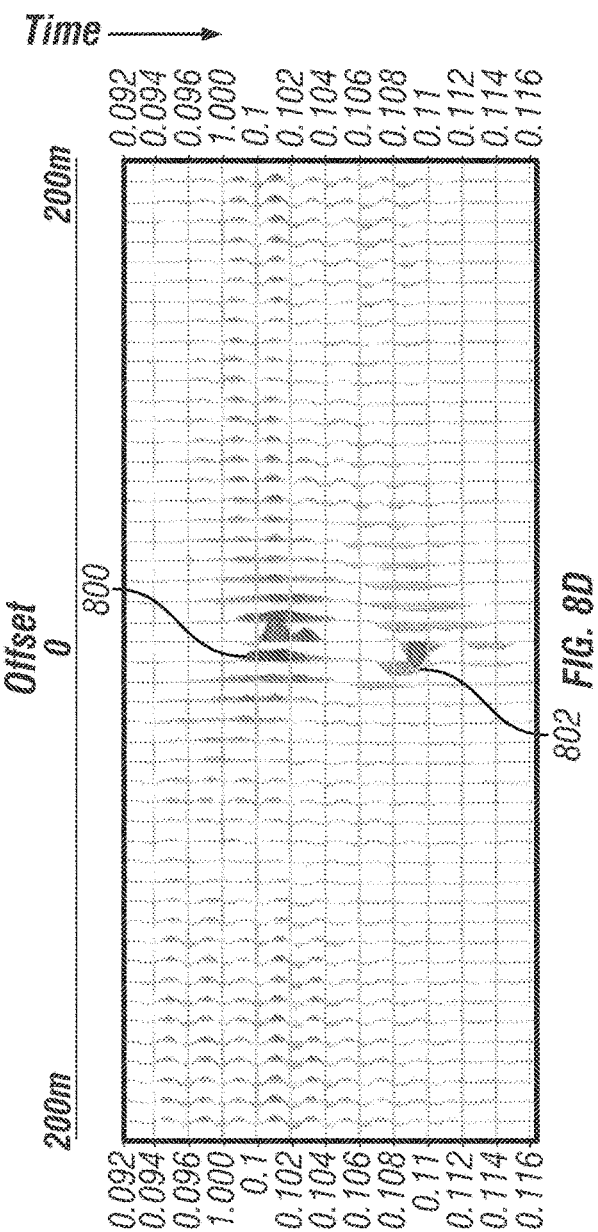

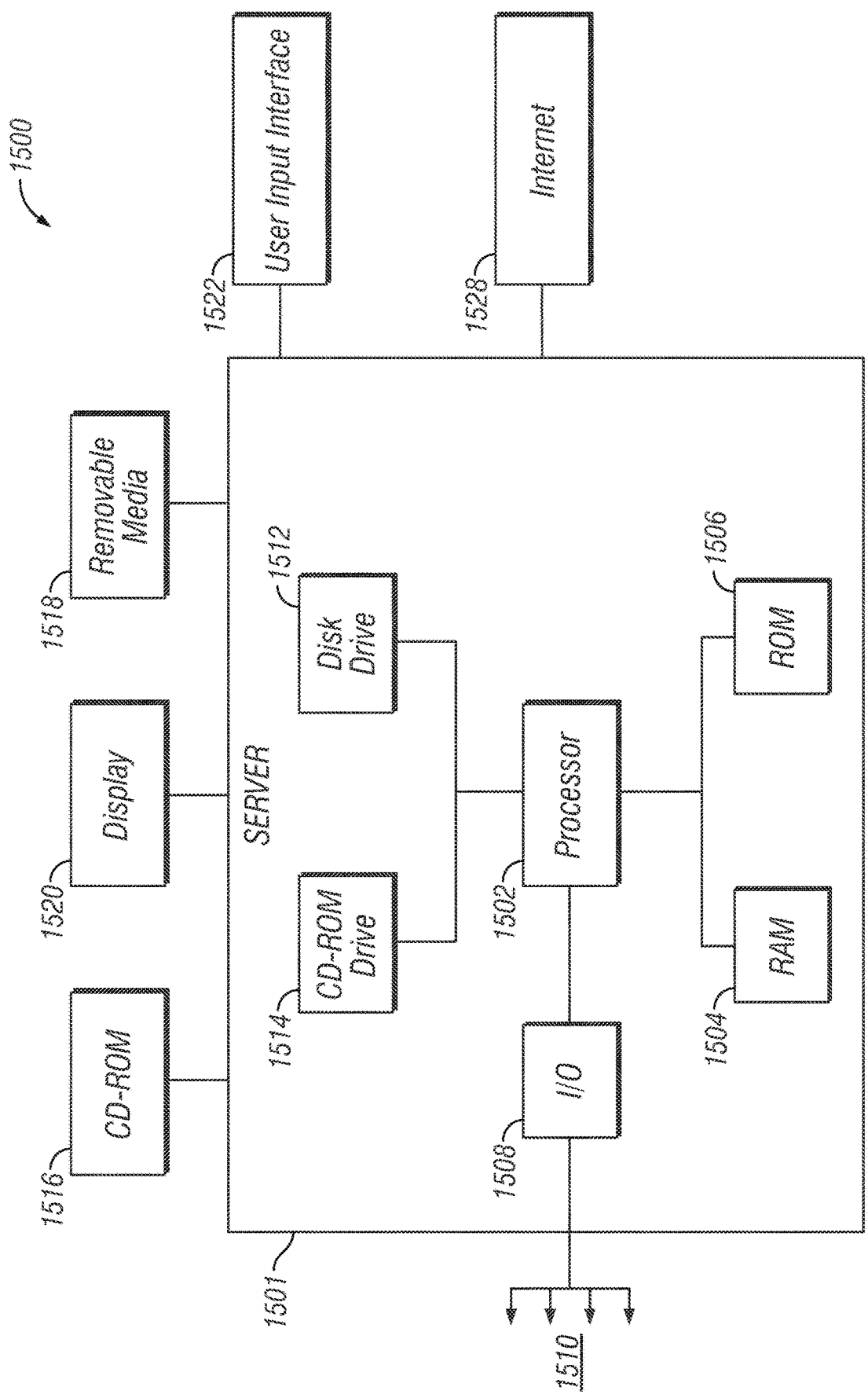

SOURCE-RECEIVER POSITION ESTIMATION USING DIRECT ARRIVAL MODELING AND INVERSION

TECHNICAL FIELD

Embodiments of the subject matter disclosed herein generally relate to methods and systems for determining the positions of seismic receivers and/or seismic sources during a marine seismic data acquisition survey, and more particularly, to mechanisms and techniques for estimating the positions of the seismic receivers and/or seismic sources based on direct arrival modeling of the seismic waves and inversion.

BACKGROUND

In oil and gas exploration and exploitation, marine seismic surveys are an important tool for making drilling-related decisions. Seismic data acquired during such a survey is processed to generate a profile, which is a three-dimensional approximation of the geophysical structure under the seafloor. This profile enables those trained in the field to evaluate the presence or absence of oil and/or gas reservoirs, which leads to better management of reservoir exploitation. Enhancing seismic data acquisition and processing is an ongoing process.

FIG. 1 is a vertical-plane view of a generic marine survey setup 100. A vessel 101 tows a seismic source 102 (note that, for simplicity, the source's full configuration is not shown) and streamers (only one streamer 104 is visible in this view) in a towing direction T. When the seismic source is activated, seismic energy is emitted into the water and propagates into the rock formation under the seafloor 110. The seismic energy is partially reflected and partially transmitted at interfaces where the acoustic impedance changes, such as at the seafloor 110 and at an interface 112 inside the rock formation. Reflected energy may be detected by sensors or receivers (where a sensor is understood to mean a physical device that records seismic data and a receiver is understood to mean a unit that includes a plurality of sensors for which the signals measured by the plurality of sensors are combined and represent the signal of the receiver) 106 (e.g., hydrophones, geophones and/or accelerometers) carried by the streamers. The seismic data represents the detected energy.

As illustrated in FIG. 1, conventional marine seismic surveys typically mobilize a single vessel 101 towing typically two airgun source arrays 102 in front of a spread of ten or more streamers 104. The data acquired in this way are narrow-azimuth and lack near offsets owing to the distance between the sources and the streamers, which can be in the range of 100 to 200 m for the inner cables and up to 500 m for the outer cables of the streamer spread.

By moving some of the sources so that they are directly over the deep-towed streamers, a much better and denser sampling of the reflected narrow cone of energy from the target is achieved. Such a configuration was introduced by U.S. Patent Application Publication 2017/0017005 (herein "the '005 publication"), assigned to the assignee of this application. This configuration is illustrated in FIG. 2 (it corresponds to the configuration shown in FIG. 7 of the patent application publication noted above) and is capable of recording near- and zero-offset data, which is important to achieve for high-resolution subsurface imaging and to improve multiple prediction and subtraction.

FIG. 2 illustrates a data acquisition system including two different source sets, a front set including sources 210 and a top set including sources 220. Top sources 220 are towed directly over the streamer spread 230. Source line 200 corresponding to the front source 210 coincides with sail line 205, and is offset along a cross-line Y direction from source line 201, which corresponds to top source 220. FIG. 2 also indicates (using dashed lines) the sail lines 204 and 206 and corresponding source lines adjacent to sail line 205, along which the illustrated system sails at various times.

A TopSeis configuration 300 is considered herein to include, as illustrated in FIG. 3, a streamer vessel 302 that tows a streamer spread 304, the streamer spread 304 including a given number of streamers 306, and a source vessel 320 that tows one or more sources 322 directly over the streamer spread. These sources are called herein top sources because they are located directly above (along a vertical direction Z) the streamer spread. The streamer vessel 302 also tows plural sources 308, which are called herein front sources because these sources are located in front (along the inline direction X) of the streamer spread 304. Note that FIG. 3 shows the streamer spread 304 being connected at point 310 to the streamer vessel 302 by tow lines 309, which are not part of the streamer spread. Thus, the front sources 308 are not directly above (along the vertical Z direction) the streamer spread 304. In one embodiment, the streamer vessel 302 may be configured to tow both the front sources 308 and the top sources 322. As discussed above, streamers 306 may be horizontal, slanted or curved.

In this document, a source is defined as including an array of source elements, where a source element is a single airgun or a single vibrator. It is customary in the marine acquisition field to have the source elements arranged as two or three subarrays, each subarray having a plurality of source elements. The two or three subarrays together form the source or source array. Thus, the source 308 or 322 in FIG. 3 includes plural source elements, that may be arranged in one, two, three or more subarrays.

While the TopSeis configuration provides an improved azimuth, this configuration is affected by the positioning errors of the receivers and/or sources at the middle part of the streamers. In this regard, FIG. 4 shows a traditional seismic survey system 300 that includes at a head 306A of each streamer 306, a GPS system 320A and at a tail 306B of each streamer, a GPS system 320B. The GPS systems are placed on corresponding buoys that float at the water surface and each buoy is attached with a cable to the streamer. The GPS systems provide information to the vessel 302 about the location of the heads and tails of the streamers. This information has an accuracy of about 1 m along the inline direction X and 1 m along the cross-line direction Y. The offset axis 330 indicates a distance, in meters, from the vessel 302, along the inline direction, to the various elements of the streamer spread.

For the middle portions of the streamers, no GPS systems are available. For these portions, an acoustic network of sensors 322 and various compasses 324 are attached to the streamers for estimating the receivers' positions. The acoustic network of sensors 322 emit and record sound waves for establishing the relative positions of the streamers and the compasses 324 determine a direction of the corresponding portions of the streamers. Based on this information, a global processor 340 located on the vessel 302 estimates the position of each receiver on the streamer. The accuracy of this estimation is about 1 m along the inline direction and about 10 m along the cross-line direction for the middle of the streamers.

These accuracies are well suited for conventional acquisition systems, i.e., for systems in which the sources are placed ahead of the streamers along the inline direction, because an error of 10 m in the middle of the streamer corresponds to an offset of a few kilometers. This means that the position accuracy of the receivers is smaller than 1/100 of the offset.

However, for a TopSeis configuration, where the top source is located on top of the seismic receiver and the offset distance can be as small as 20 m, the 10 m accuracy represents about ½ of the offset, which will negatively affect the recorded data as the error positioning of the receivers is comparable to the offset distance.

A technique that uses the direct arrival (i.e., the wave that propagates directly from the source to a receiver) for assessing positions of the receivers has been tried. However, only a time shift measurement is generally used by this technique whereas, at a short range from the source, this approach is not correct. The direct arrival is not a simple event, as it is the product of many source elements recorded by a sensor array. To make the matter even more complex, a source ghost is affecting the phase of the direct arrival in a spatially variant way. Finally, for very near offsets, as in the case of the TopSeis configuration, the direct arrival is so energetic that its amplitude is clipped by the acquisition system. For all those reasons, the peak of the direct arrival wavelet does not correspond to the arrival time of the direct arrival. An inversion based on the arrival time of direct arrivals is therefore inherently unreliable and this is one main reason why the existing methods that use the direct arrival fail to accurately estimate the positions of the receivers and/or sources.

Thus, there is a need to provide a more accurate positioning method of the receivers and/or sources for a TopSeis configuration.

SUMMARY

Methods and systems to estimate positions of seismic receivers and/or sources based on direct arrival modeling and inversion.

According to an embodiment, there is a method for correcting physical positions of seismic sensors and/or seismic sources for a seismic data acquisition system. The method includes estimating a respective energy generated by each source element, which belongs to a source array; calculating a respective energy recorded by each individual seismic sensor, which belongs to a composite receiver, from each source element of the source array, wherein the recorded energy takes into account a position of each source element within the source array and a position of each individual seismic sensor within the composite receiver; summing, for each individual seismic sensor, all the generated energies from the all the source elements; estimating a model of direct arrival waves that propagate from the source elements to the individual seismic sensors, based on characteristics of the acquisition system; calculating positions of the individual seismic sensors based on the model of direct arrival waves; comparing calculated positions of the individual seismic sensors with observed positions of the individual seismic sensors; selecting a best calculated position for each of the individual seismic sensors based on an objective function; and correcting the observed positions of the individual seismic sensors with corresponding best calculated positions.

According to another embodiment, there is a computing device for correcting physical positions of seismic sensors and/or seismic sources for a seismic data acquisition system. The computing device includes an interface configured to receive a position of each source element within the source array and a position of each individual seismic sensor within a composite receiver; and a processor connected to the interface. The processor is configured to estimate a respective energy generated by each source element, which belongs to the source array; calculate a respective energy recorded by each individual seismic sensor, which belongs to the composite receiver, from each source element of the source array, wherein the recorded energy takes into account the position of each source element within the source array and the position of each individual seismic sensor within the composite receiver; sum, for each individual seismic sensor, all the generated energies from the all the source elements; estimate a model of direct arrival waves that propagate from the source elements to the individual seismic sensors, based on characteristics of the acquisition system; calculate positions of the individual seismic sensors based on the model of direct arrival waves; compare calculated positions of the individual seismic sensors with observed positions of the individual seismic sensors; select a best calculated position for each of the individual seismic sensors based on an objective function; and correct the observed positions of the individual seismic sensors with corresponding best calculated positions.

According to still another embodiment, there is a method for correcting physical positions of seismic sensors and/or seismic sources for a seismic data acquisition system. The method includes estimating a respective energy generated by each source element, which belongs to a source array; calculating a respective energy recorded by each individual seismic sensor, which belongs to a composite receiver, from each source element of the source array, wherein the recorded energy takes into account a position of each source element within the source array and a position of each individual seismic sensor within the composite receiver; summing, for each individual seismic sensor, all the generated energies from the all the source elements; estimating a model of direct arrival waves that propagate from the source elements to the individual seismic sensors, based on characteristics of the acquisition system; calculating positions of the individual seismic sensors based on the model of direct arrival waves; extracting a parameter by comparing the calculated positions of the individual seismic sensors with observed positions of the individual seismic sensors; applying an inversion process to the parameter for determining a best calculated position for each of the individual seismic sensors based on an objective function; and correcting the observed positions of the individual seismic sensors with corresponding best calculated positions.

According to yet another embodiment, there is a computing device for correcting physical positions of seismic sensors and/or seismic sources for a seismic data acquisition system. The computing device includes an interface configured to receive a position of each source element within the source array and a position of each individual seismic sensor within a composite receiver and a processor connected to the interface. The processor is configured to estimate a respective energy generated by each source element, which belongs to the source array; calculate a respective energy recorded by each individual seismic sensor, which belongs to the composite receiver, from each source element of the source array, wherein the recorded energy takes into account the position of each source element within the source array and the position of each individual seismic sensor within the composite receiver; sum, for each individual seismic sensor, all the generated energies from the all the source elements; estimate a model of direct arrival waves that propagate from the source elements to the individual seismic sensors, based on characteristics of the acquisition system; calculate positions of the individual seismic sensors based on the model of direct arrival waves; extract a parameter by comparing the calculated positions of the individual seismic sensors with observed positions of the individual seismic sensors; apply an inversion process to the parameter for determining a best calculated position for each of the individual seismic sensors based on an objective function; and correct the observed positions of the individual seismic sensors with corresponding best calculated positions.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 8A to 8D illustrate a direct arrival and its ghost for various combinations of source elements and individual seismic receivers;

FIG. 11A illustrates recorded data for a given source-receiver configuration for a marine seismic survey while

FIG. 14A illustrates successive observed positions of a streamer receiver for each streamer that is towed by a streamer vessel while FIG. 15 is a schematic of a computing device in which the methods and processes discussed herein can be implemented.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a marine seismic data acquisition having a front set of sources and a top set of sources. However, the current inventive concepts may be used for other types of surveys, such as surveys having only top sources or for surveys that use drones, autonomous underwater vehicles, unmanned survey vessel, or a combination of them to tow one or more of the sources.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 5:
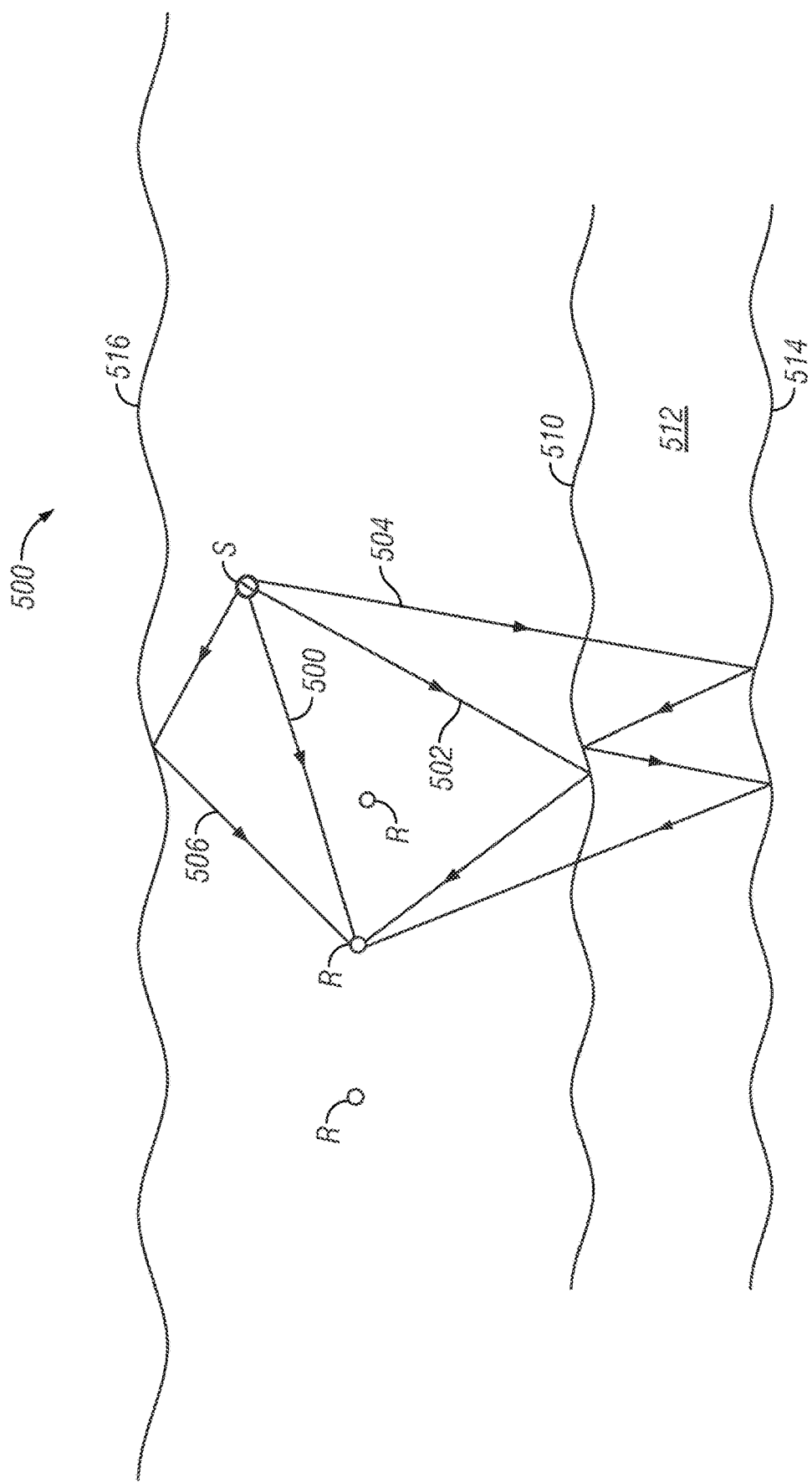
FIG. 5 schematically illustrates a direct arrival wave, a primary, a ghost, and a multiple.

According to various embodiments described in this section, a direct arrival model is generated for the direct arrival seismic waves and an inversion process is used to estimate the acquisition geometry (i.e., positions of sources and receivers) that best predicts the observed data. A direct arrival wave is a wave that propagates in a straight line from the source to the receiver, as illustrated in FIG. 5. FIG. 5 shows a system 500 that includes a source element S and a receiver R. The source element S generates plural seismic waves in all directions (FIG. 5 shows only waves 500, 502, 504, and 506). The seismic wave 500 is the direct arrival, the wave 502 (the primary) is only reflected from the ocean bottom 510 or another subsurface interface, the wave 504 is a multiple, i.e., a wave that enters through a layer 512 and reflects on another interface 514, and a wave 506 (the ghost) that is reflected from the water surface 516.

Figure 1:
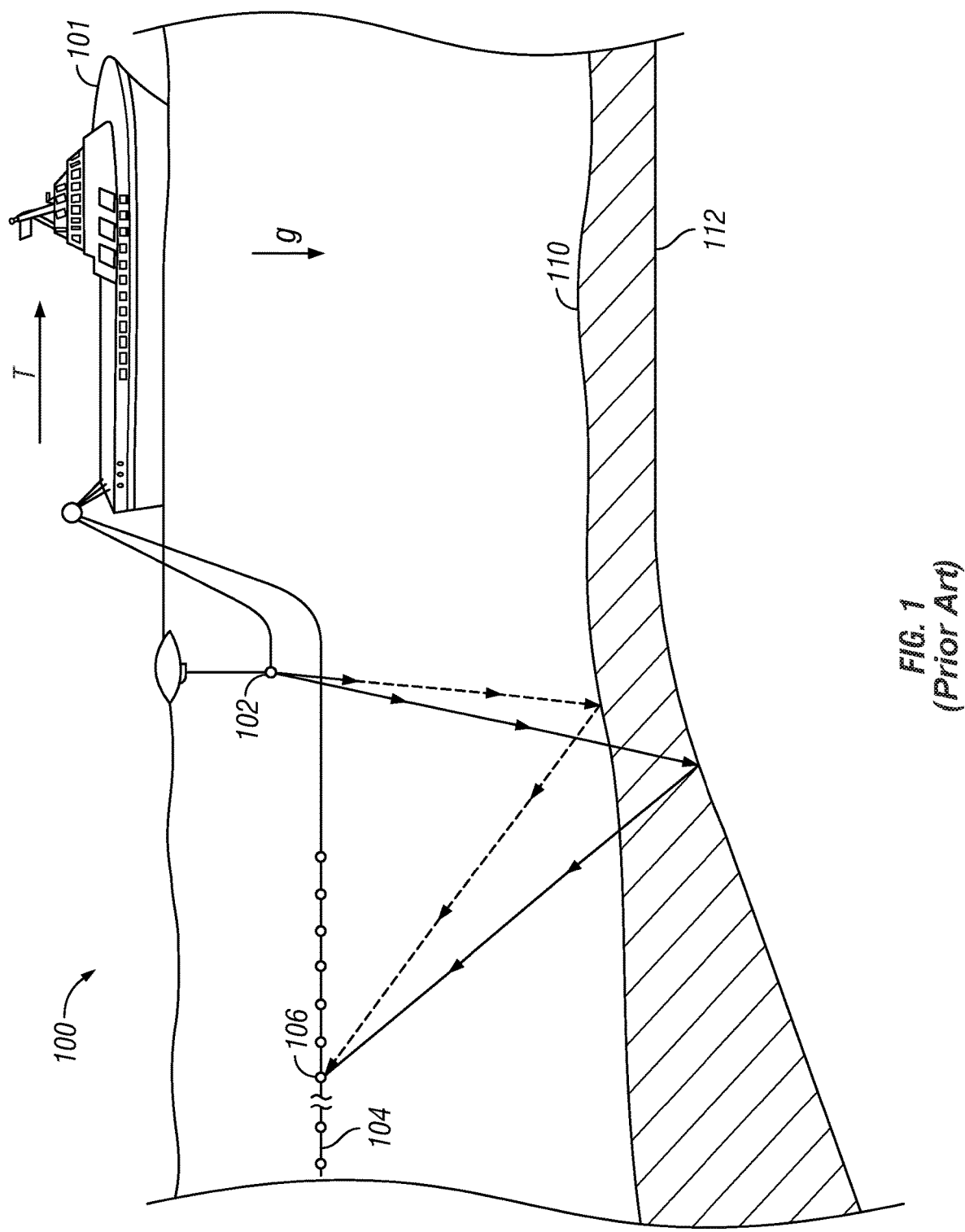
FIG. 1 illustrates a generic marine seismic survey system.
Figure 2:
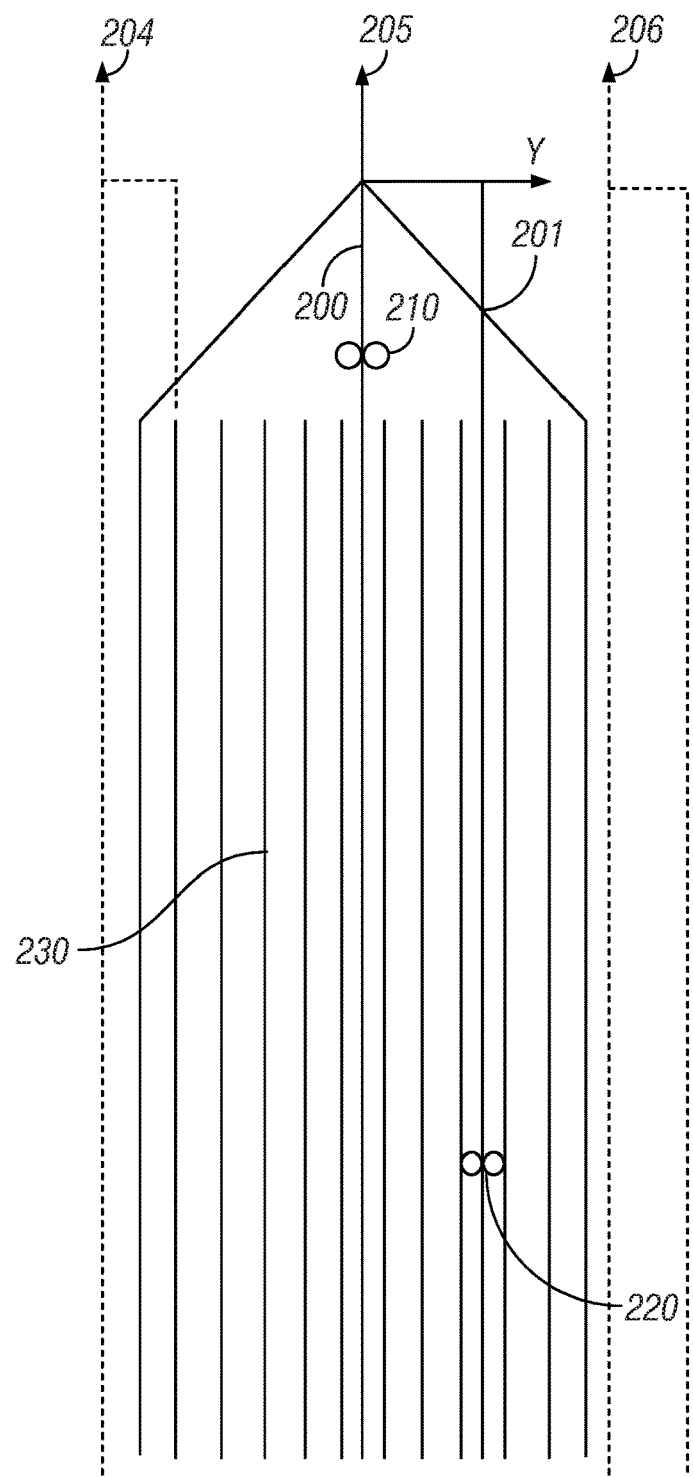
FIG. 2 is a top view of a marine survey system having front and top sources.
Figure 3:
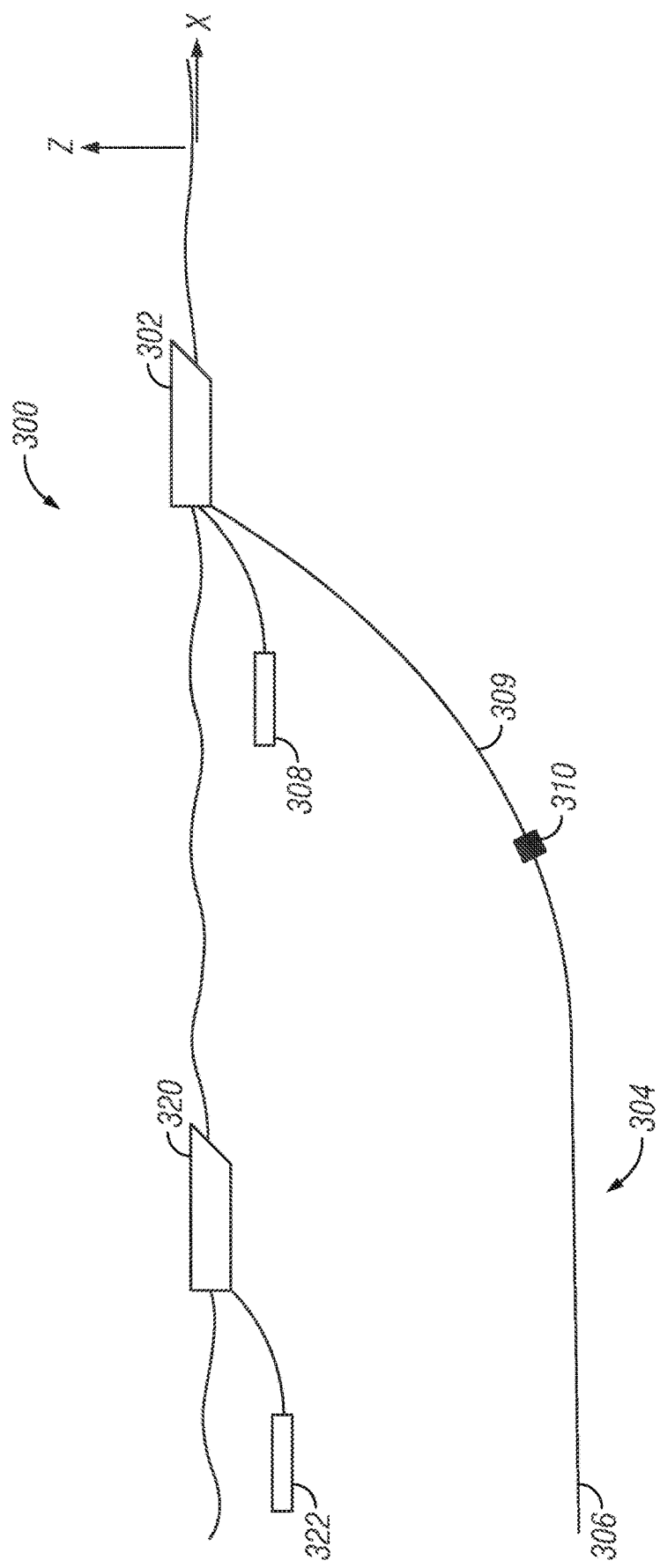
FIG. 3 is a side view of a marine survey system having front and top source arrays.
Figure 4:
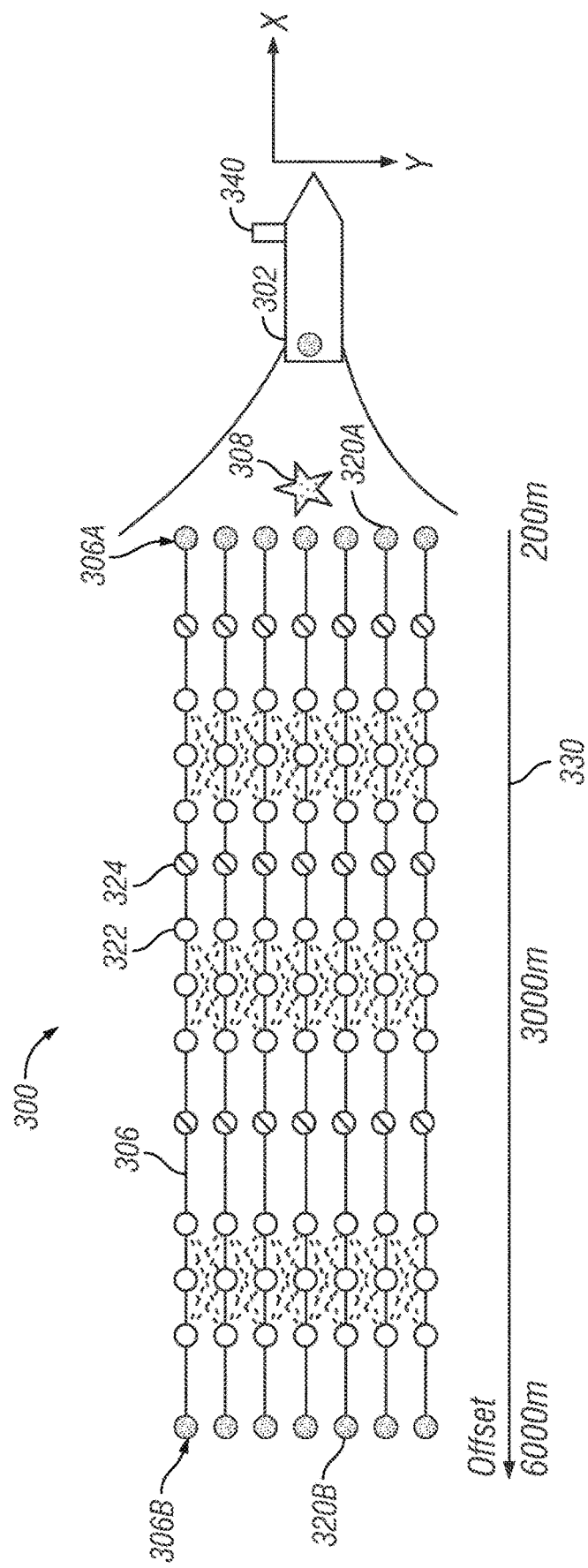
FIG. 4 is a top view of a marine survey system that uses various devices for detecting positions of the sources and streamers.

The observed data is used herein to define data obtained from various devices as illustrated in FIG. 4 (compass, GPS system) while estimated/calculated data is used herein to refer to positions of the sources and/or receivers calculated according to methods that use a direct arrival model and an inversion process.

The method may be used onboard the towing vessel (either the streamer vessel or the source vessel or both) as an independent quality control (QC) check of the navigation system, but also in the first step of the processing of the seismic data to improve the geometry of the recorded seismic data. In addition of improving the 3D imaging of the surveyed surface, this method could also have a significant impact on 4D seismic acquisition campaigns.

The method takes advantage of the good azimuthal coverage to detect the source position with respect to the receivers as the direct arrival 500 is almost perfectly isotropic. The primaries 502 and the multiples 504 have a potential anisotropy due to dips, rock properties, fractures, and thus, they cannot be used to determine the positions of the receivers and/or sources.

Existing methods that use the direct arrivals extract only the arrival times of these waves and using the symmetry (and/or triangulation), they detect the source position. Note that the direct arrival 500 arrives first at the receiver, followed by the ghost 506, primaries 502, and the multiples 504. Thus, the direct arrival wave can easily be identified in the recorded traces for short offset ranges, e.g., less than 500 m, as this is the first wave that arrives at the receiver (or the first disturbance in a trace).

Figure 6A:
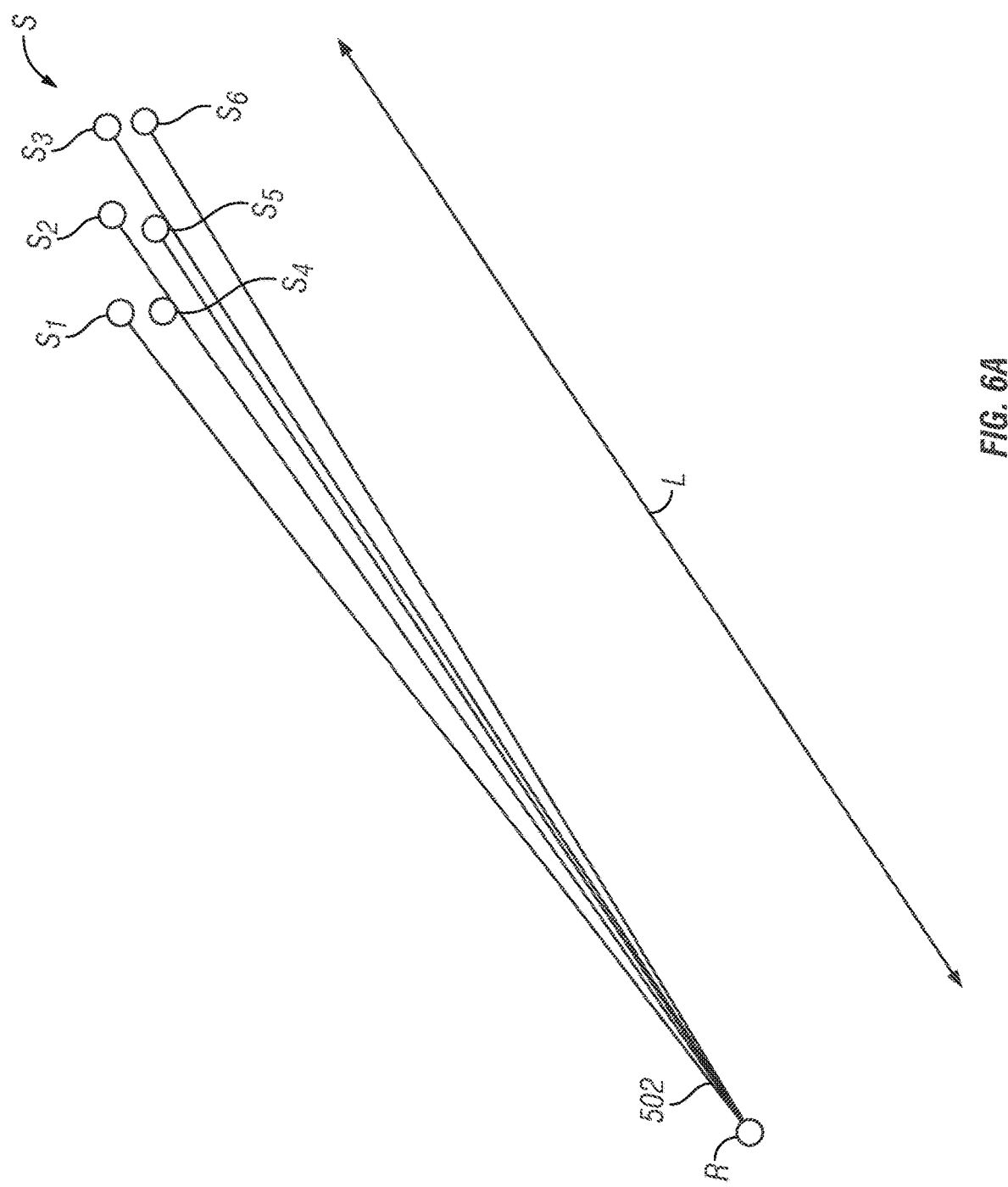
FIG. 6A illustrates wave propagations from a source array to a receiver in a far-field approximation and FIG. 6B illustrates wave propagations from a source array to a receiver in a near-field approximation.
Figure 6B:
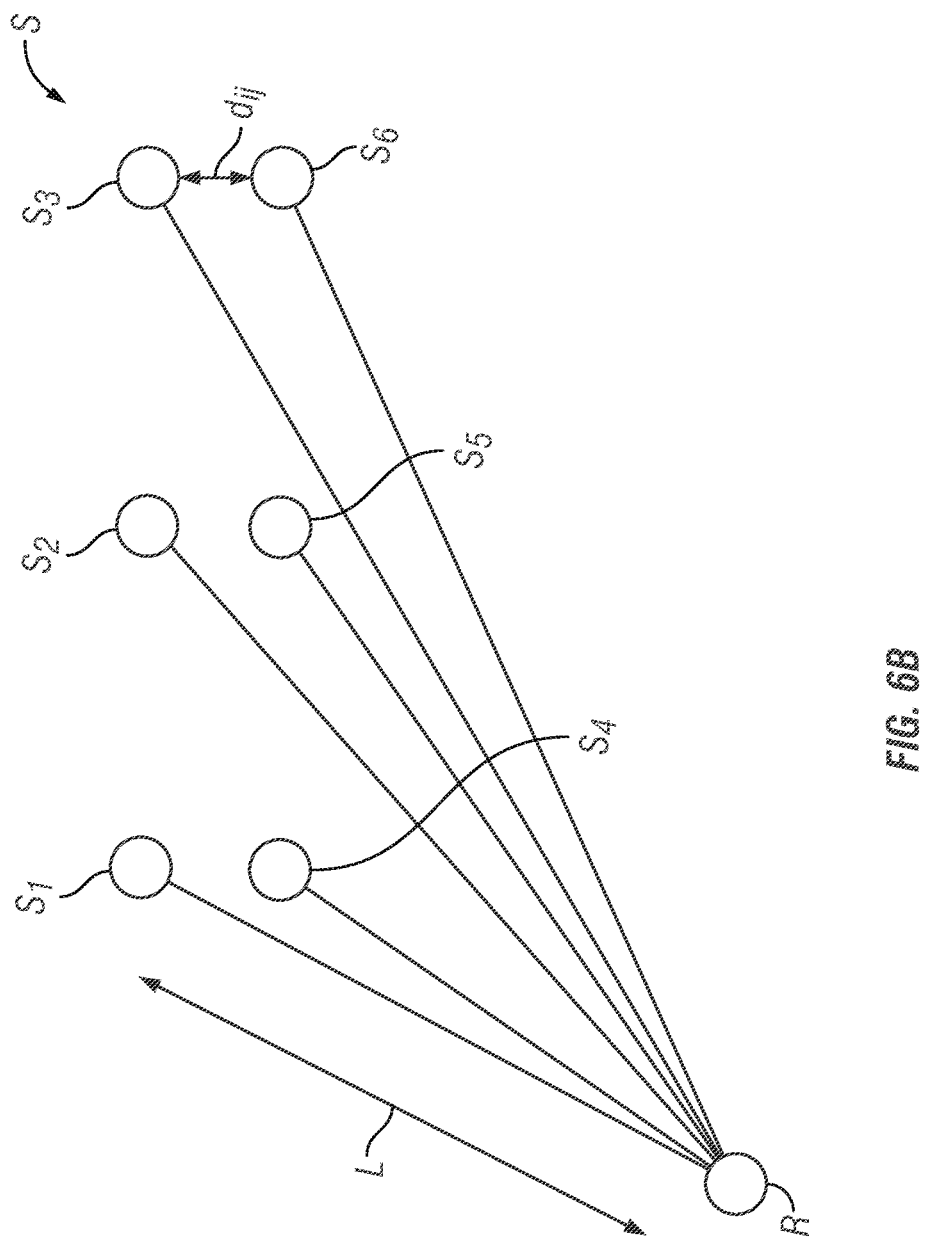

However, because of the specific configuration of the TopSeis acquisition system, and due to the short range between the top source and the receivers below, the direct arrival waves 500 cannot be assumed to be a single event as in the traditional methods. Picking the event time is biased under this scenario. FIG. 6A shows a traditional system in which a distance L between the receiver R and the source elements S1 to S6 (which form the source S) is in the order of kilometers, and thus, it is assumed that the direct arrival 502 is a single wave that propagates from S to R and the individual distances between the source elements Si and Sj is too small to matter. This regime is called far-field in the art. For the TopSeis configuration, which is illustrated schematically in FIG. 6B, the distance L between the source elements and the receiver is so small, such that the distances $d_{ij}$ between the source elements $S_i$ and $S_j$ cannot be ignored and the wave from each source element to the receiver should be considered. This regime is called near-field in the art. Thus, the present method considers the waves from each of the individual source elements when propagating to the individual seismic receivers.

The traditional methods also do not take into consideration the ghost 506 effect variation with the depth of the source, which induces an offset dependent effect. When the top source is so close to the receiver, the ghost may arrive at the receiver very close in time relative to the direct arrival. Thus, the ghost interference is included by the present method.

Figure 7:
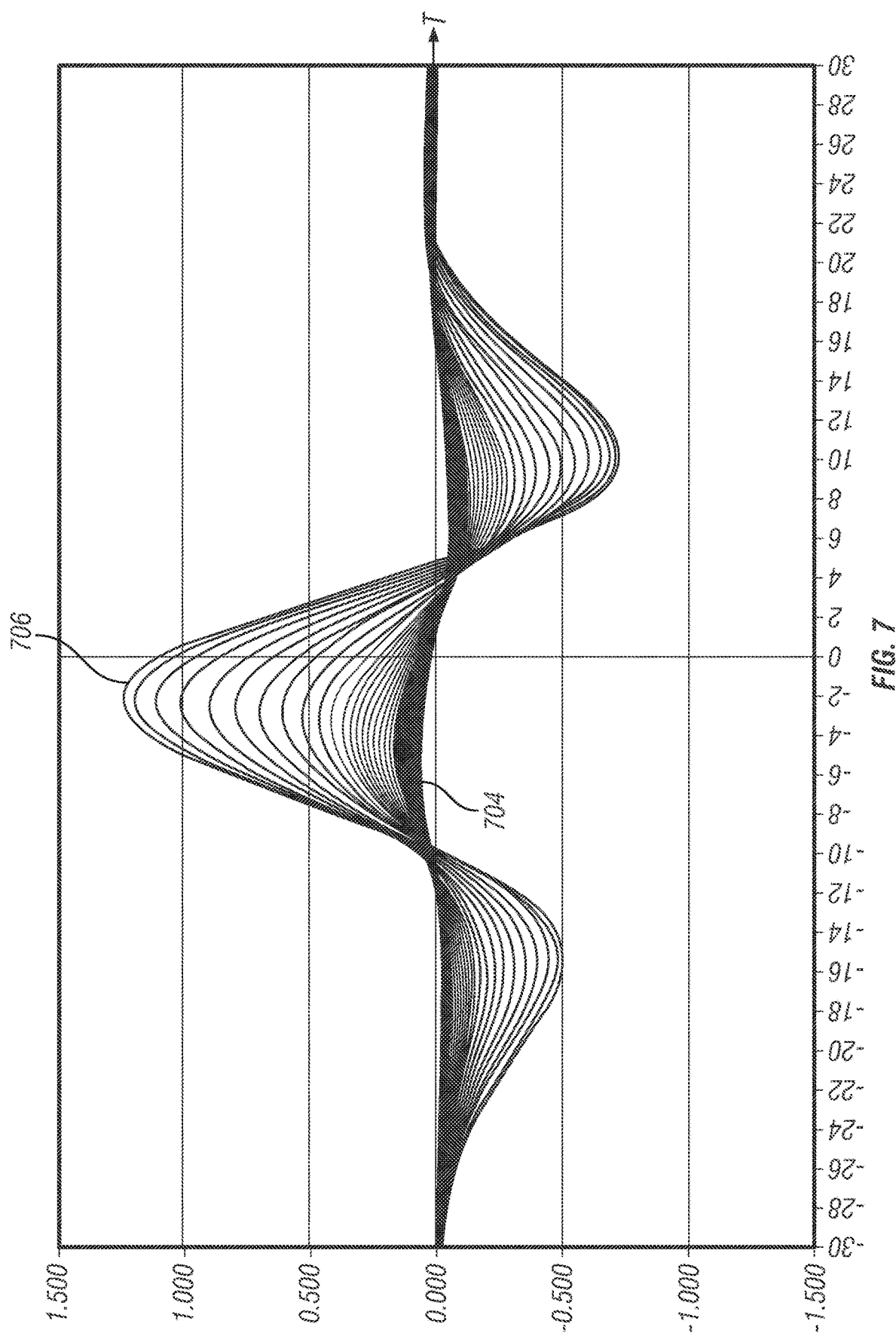
FIG. 7 is a synthetic modeling of a direct arrival that varies with an offset.

Further, the traditional methods do not take into account the phase effect of the acquisition system's filter. In this regard, FIG. 7 is a synthetic modeling of a direct arrival for a source S at 5 m depth, whose signature is a simple Ricker wave zero phase centered at T=0. The responses plotted in FIG. 7 vary from the response 706, which corresponds to the zero-offset trace (that is, 30 meters below the source) to the response 704, which represents the direct arrival response for largest offset. Due to the interference with the ghost, even at the nearest offsets, the maximum of the signature is not centered at zero (as should be the case for a zero-phase wavelet). FIG. 7 shows that the maximum of the direct arrival is offset from −2.0 milliseconds for the zero offset, up to −6 milliseconds for the 150 meters offset. Thus, this shows that simply extracting the arrival times from the direct arrivals will be tainted with errors and bias.

Another effect that is ignored by the traditional methods is the response of the electronics of the acquisition chain. In this regard, the receivers measure pressure changes by producing an electrical signal in volts. This signal is clipped by the electronics at a certain value before being filtered and sampled. Signal clipping applies only to very large amplitudes and does not normally concern conventional seismic data. However, in the case of the direct arrival at very low offset, as in the TopSeis configuration, the recorded amplitude is typically clipped by more than 60%. Thus, this clipping effect should be implemented into the model to make it possible to better take into account the position of the maximum of the signal. In this respect, it is known that the signal propagating to the seismic sensor has a maximum at a position t=0. After the signal is clipped by the electronics, for example at 0.8, the filtered version of the clipped signal exhibits two maxima instead of one and these maxima are not placed at t=0. This effect is implemented into the model used in this method.

Figure 8A:
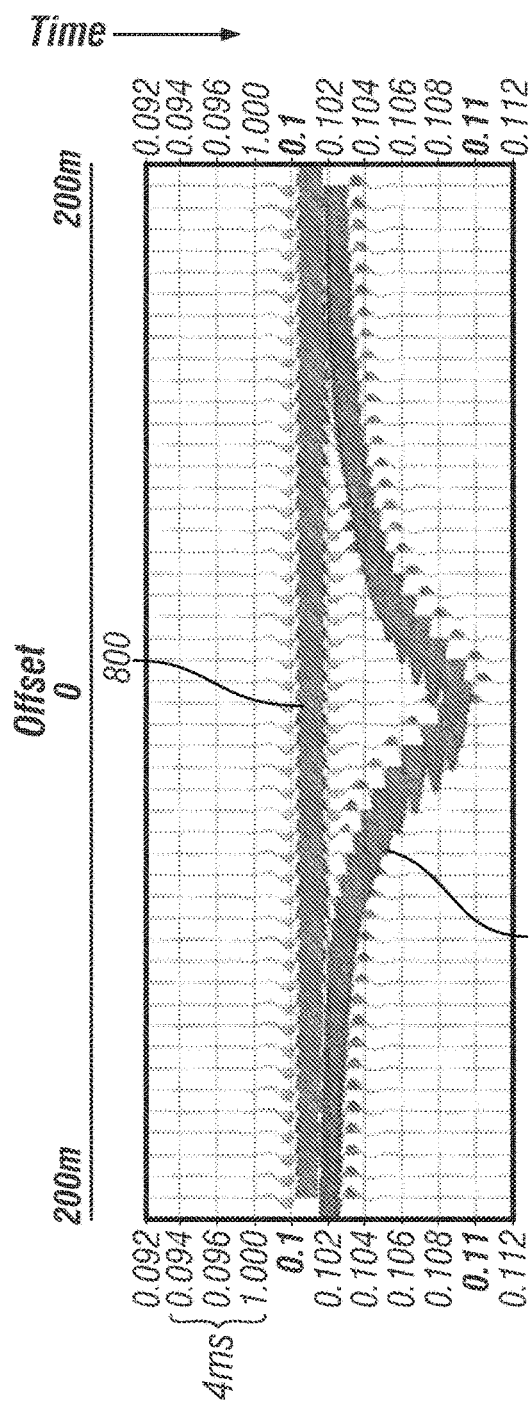
Figure 8B:
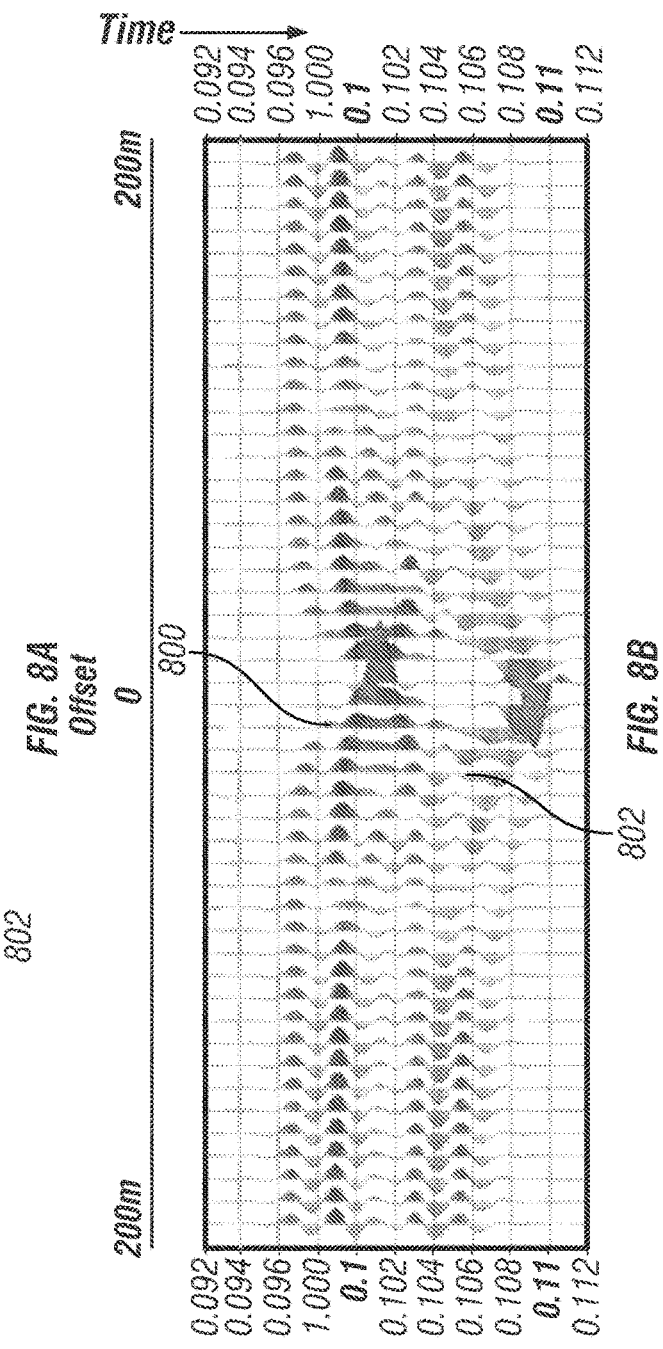

Still another factor that is not taken into consideration by the traditional estimation methods is the full signal shape of the direct arrival and its variations due to position changes. In this regard, FIGS. 8A-8D illustrate the effect that all the above factors have on the direct arrival model. FIG. 8A shows one direct arrival wave 800 (forward linear moveout (LMO) has been applied to flatten the wave) and one ghost wave 802 having constant amplitude. Both the source and the receiver are considered to be punctual elements. FIG. 8B shows the same when the source is still considered to be a single point and the receiver includes an array of receivers (e.g., 8 receives in this case), i.e., a composite receiver. The interference generated by the signals is responsible for the amplitude variation noted in this figure.

FIG. 8C show the waves recorded by the receiver when the source is replaced with a source array (e.g., the source array includes 30 source elements) and the receiver is a point receiver. Strong interference is still present, which is responsible for the amplitude variation. FIG. 8D combines the source array with the sensor array (i.e., composite receiver), which is responsible for 240 individual contributions (30 for the source times 8 for the sensors), with very strong amplitude variation.

Figure 9:
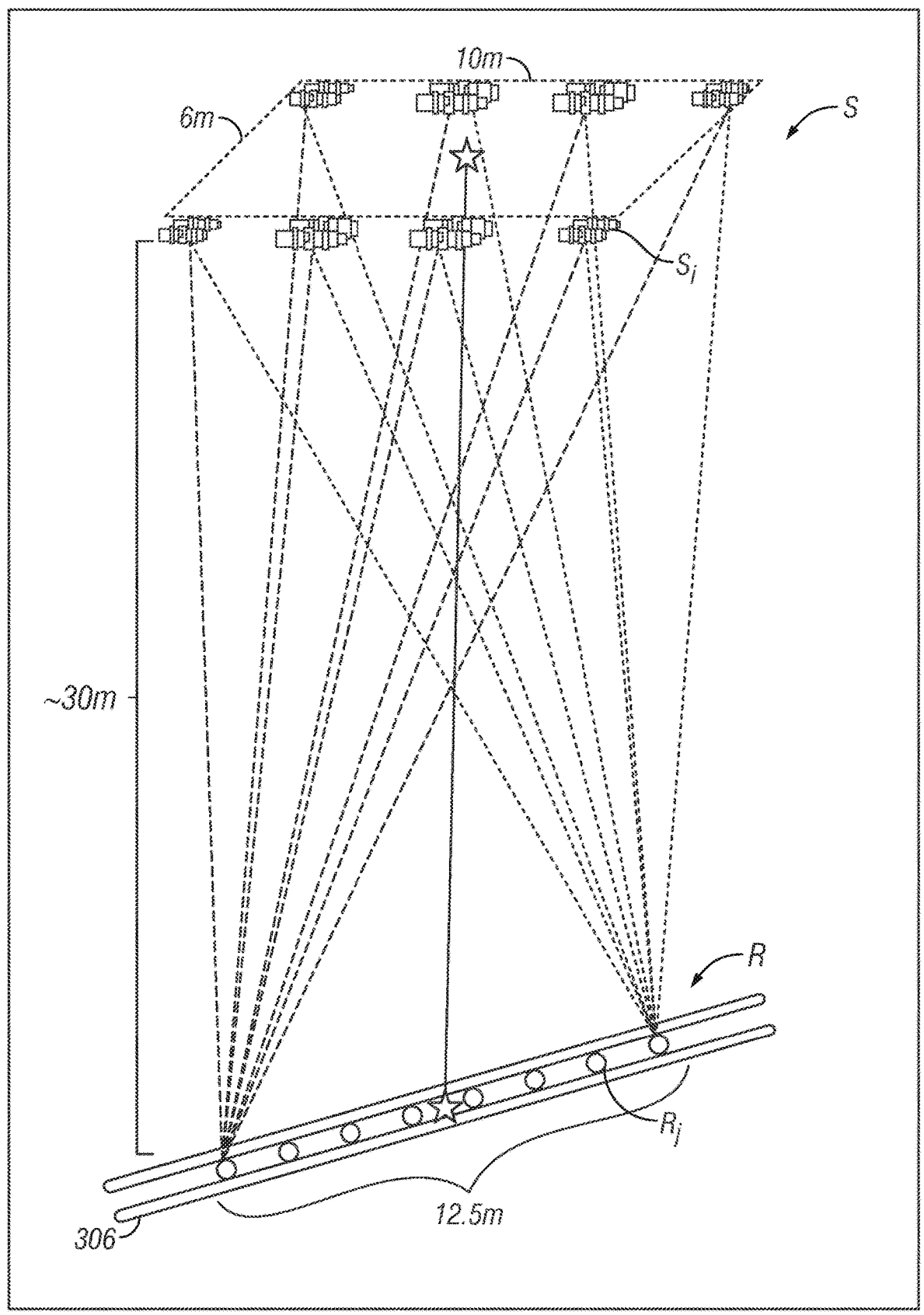
FIG. 9 illustrates how seismic waves from plural source elements propagate to plural individual seismic receivers that form a composite receiver.

FIG. 9 illustrates a configuration that produces plural seismic waves which are recorded with plural seismic sensors. In the following, the term "receiver" is used interchangeably with the term "compounded receiver." The system in FIG. 9 includes plural source elements Si, which form source array S, and plural individual receivers Rj, that form the composite receiver R, where i and j can vary from one to any integer. Note that if j is 2 or larger, the signals from each individual receiver Rj is added to the other individual receivers that form composite receiver R, and thus, the combined recorded seismic data for the j individual receivers is sent to the vessel as a single trace that corresponds to the composite receiver R. The star in the streamer 306 indicates the physical position attributed to the composite receiver R that is used for processing the traces. In the embodiment shown in FIG. 9, the individual receivers Rj that form the composite receiver R are selected over a distance of about 12.5 m along the streamer 306. Other distances may be used or each individual receiver may be considered in its own as being the receiver R.

Figure 10:
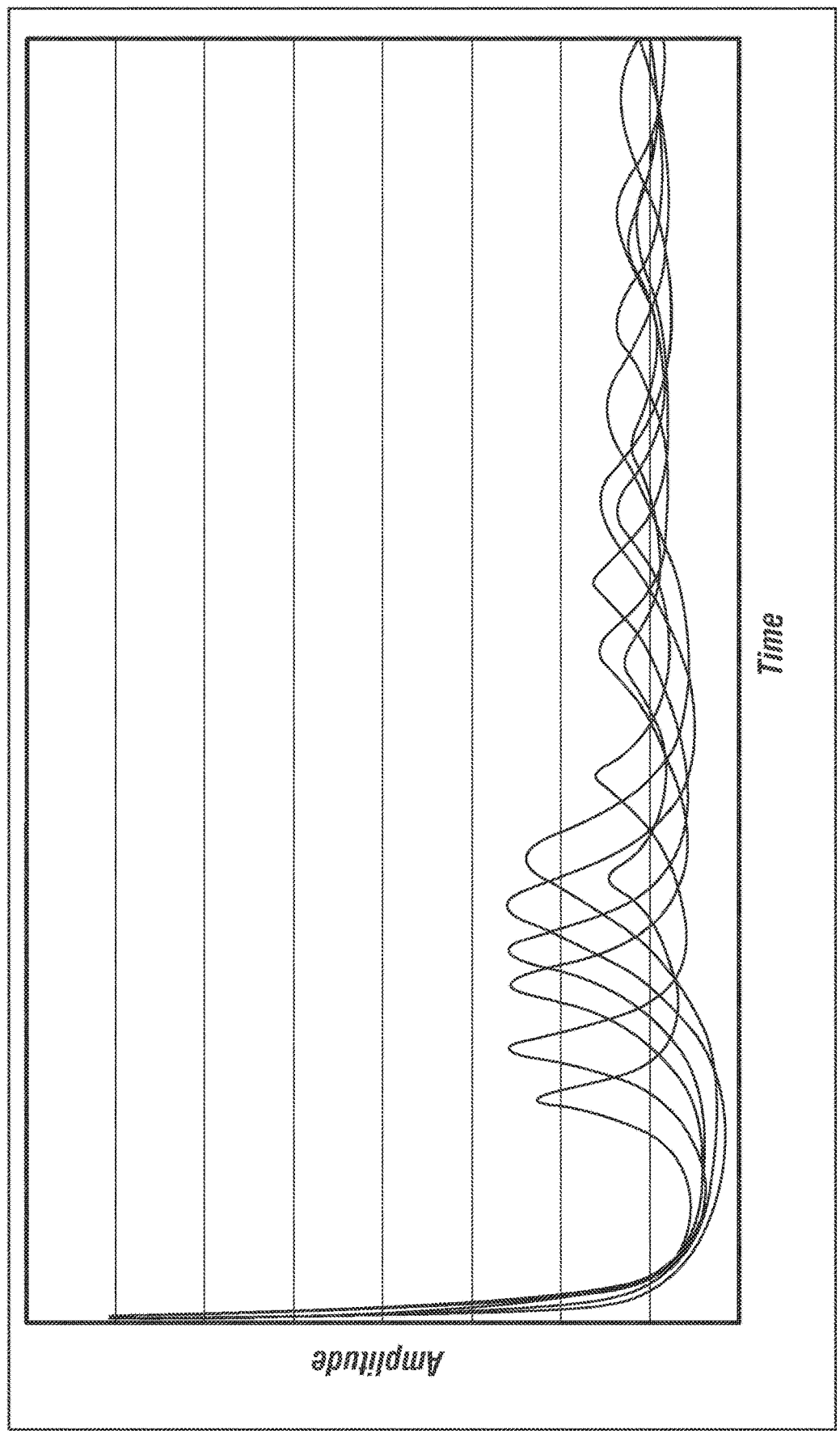
FIG. 10 illustrates the various signatures of plural source elements that form a source array.

In the method of the present invention, each source element Rj and each individual receiver Ri are considered when calculating the direct arrival and the contribution of each source element is considered as following a different ray path to a corresponding individual receiver. The signature of each source element is also considered in these calculations. The signatures (i.e., the pressure wave generated by the source over time) of eight source elements is shown in FIG. 10 and it can be seen that each signature is different from the others. In this regard, note that the traditional methods that use the direct arrival waves for determining the position of the source consider that all the source elements have the same signature.

Figure 11A:
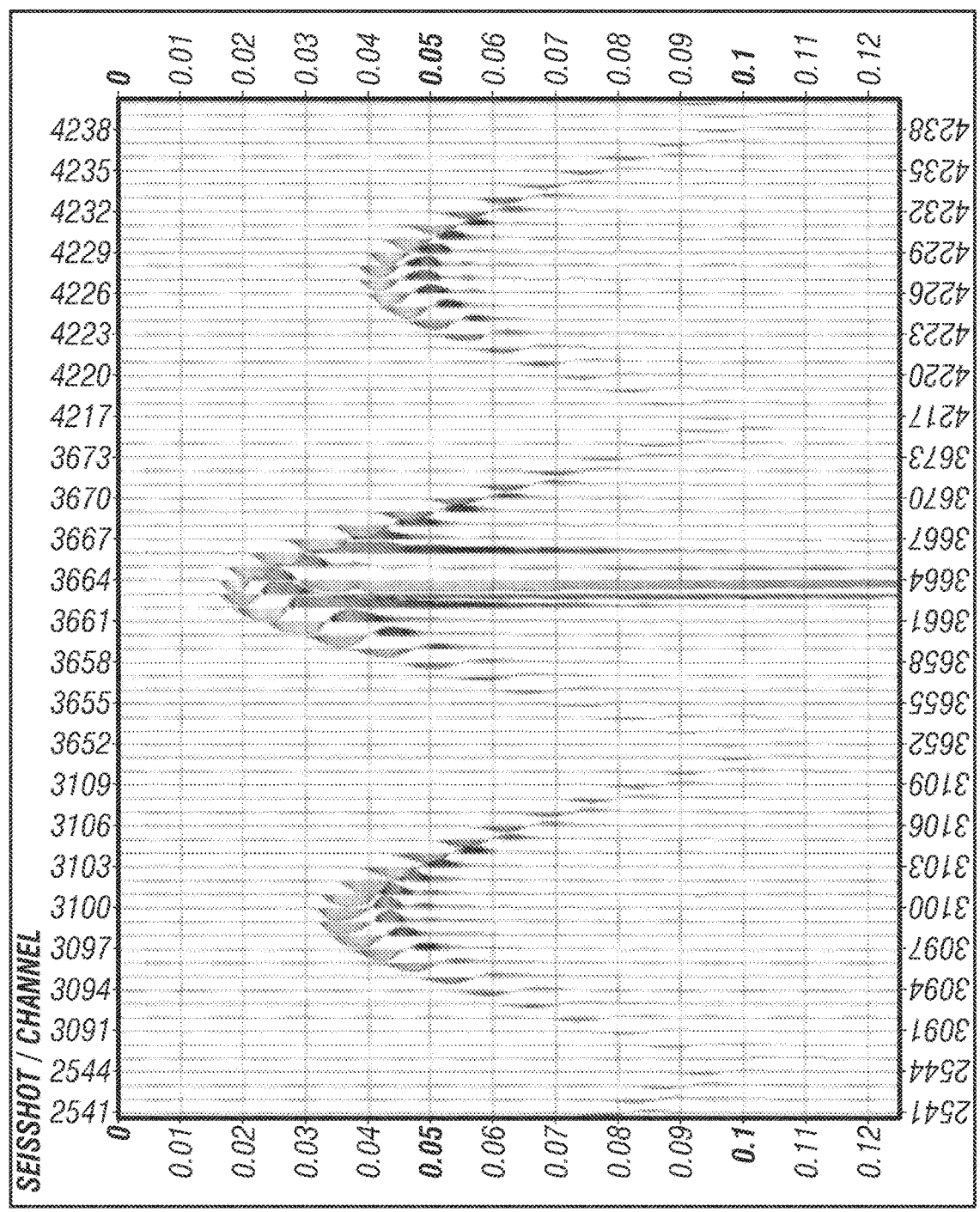
Figure 11B:
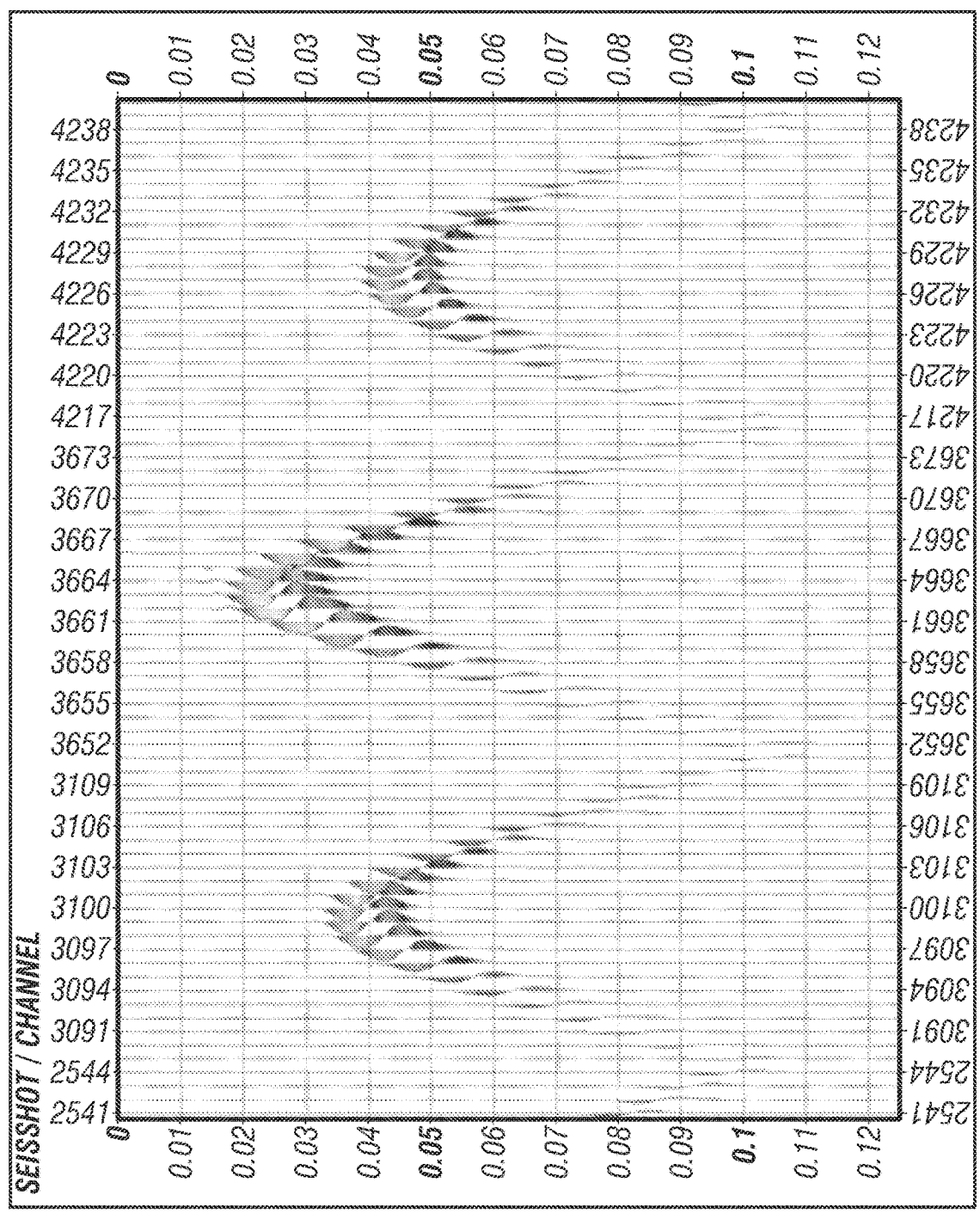
FIG. 11B shows the direct arrival model for the same configuration.

When the features identified above (i.e., geometry of the source array, individual source element signature, ghost interference, phase effect, clipping, and full signal shape) are taken into consideration by the model used by the present method to describe the direct arrival, a much accurate relative position estimate between the receivers and the sources is found. In this regard, FIG. 11A shows the recorded data for the direct arrivals for a given source-receiver configuration for a marine seismic survey while FIG. 11B shows the direct arrival model for the same configuration, where the above noted factors are taken into consideration. The distortion between the model data and the recorded data is interpreted by the method as potential relative position errors between the sources and the receivers and a correction of these errors by an inversion method would produce the estimated positions of the receivers and/or sources.

The method is based on a precise modeling of the direct arrival, which includes (1) source modeling, i.e., taking into account the contribution from each individual source element (e.g., gun) with its own characteristic (position, relative position to the other source elements, volume of air of each source element if the source element is a gun, signature of each source element), (2) the propagation of a theoretical shot through the water, which includes surface reflection (ghost), attenuation effects, ghost interference, and (3) modeling of the acquisition system, which includes receiver array geometry (see FIG. 9), clipping of the voltage recorded by each receiver, filtering, sampling, and calibration.

After computing the direct arrival time and amplitude, for example, from gun volume and spherical divergence, and the ghost arrival time and amplitude, for example, from the gun volume, spherical divergence and surface reflection, the signature of the individual source elements are applied to correct the phase and amplitude. Then, all these contributions are summed together and a Green Function may be applied for taking care of the anti aliasing filter, clipping, sampling and calibration. Note that there are known methods in the art of seismic industries for performing each of these steps, but there is no known method that combines all these steps as discussed in this document.

This modeling can be performed very efficiently, allowing the estimation of different positioning errors and detecting the source-receiver geometry that best explains the observed data. An inversion process based on minimizing the mismatch between the model and the observed data results in an optimal solution.

The process may be performed for every shot-receiver pair below a certain offset range. The restriction of the offset range is imposed to allow for reliable modelling of the direct arrival and comparison with the clean direct arrival in the observed data. This allows the extraction of a global position error with the robustness of statistical methods. The process may be performed on a shot-by-shot basis, and is stable enough to avoid the need for smoothing between shots. This allows correcting for potential instability of the navigation results. In a variant of the process, it is also possible to extract individual cable corrections and even vertical positioning errors for the receivers. The method can be used to determine positioning errors for both sources and receivers.

As previously discussed, the conventional streamer positioning systems suffer from position errors ranking from around a meter at the head or tail of streamer (which are close to GPS measurements) to up to the order of 10 m in the middle of the streamer. For near-offset acquisition techniques, such as TopSeis, these errors will have a significant impact on data quality and should be reduced. The method discussed next does exactly this. Further, the method has the potential to extract vertical positioning errors, important for a good de-ghosting (because guns are subject to up and down movement due to sea wave, whereas streamers are not affected). The proposed new method is based on an analysis of observed data, and therefore, does not require any expensive hardware to be added to the acquisition system to solve the positioning problem.

Figure 12:
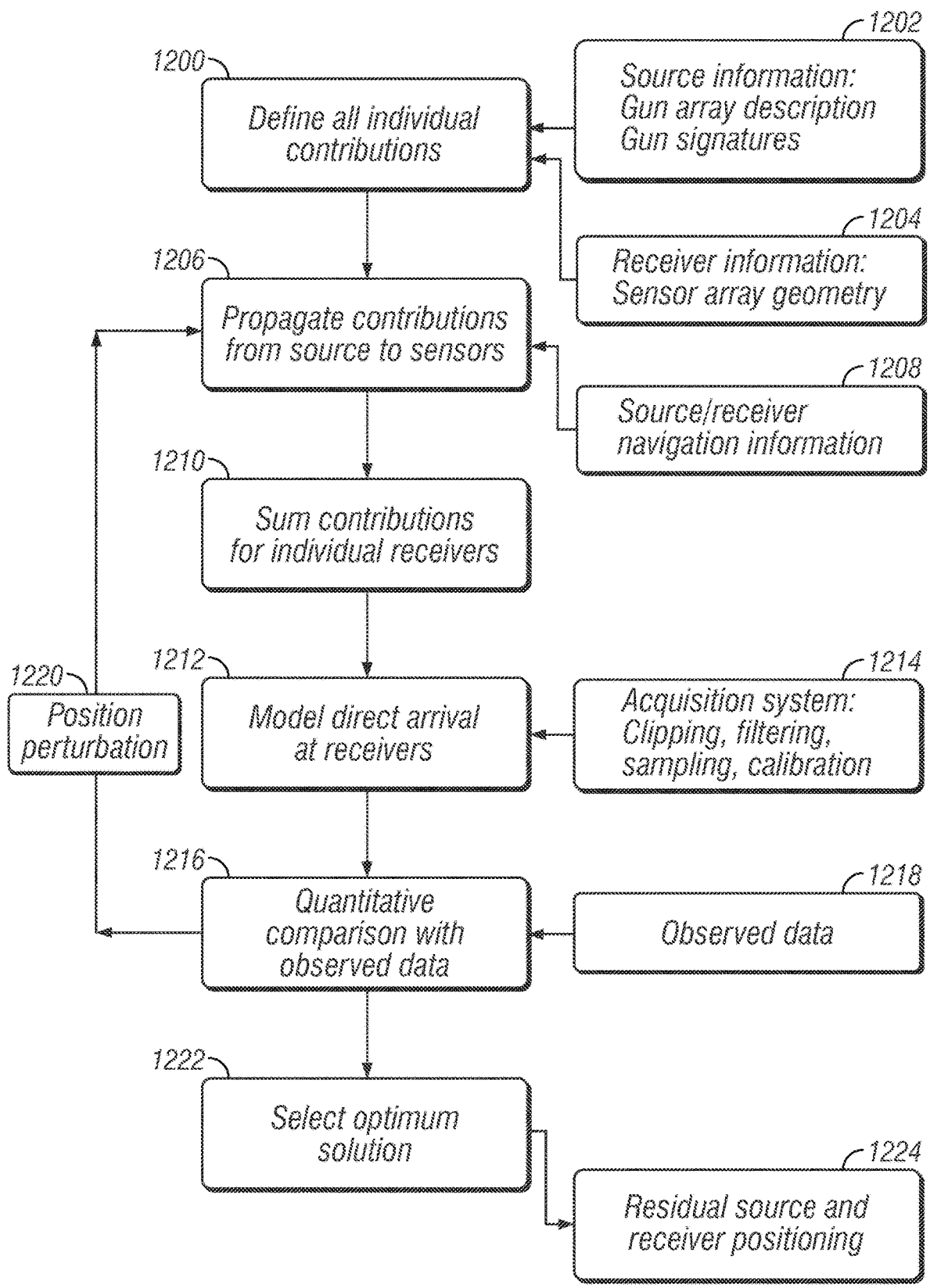
FIG. 12 is a flow chart of a method for correcting positions of individual seismic receivers and/or source elements.

A first implementation of this method is now discussed with regard to FIG. 12. In step 1200, each individual contribution of the source-receiver marine system is input. For example, in sub-step 1202, the information about the source is provided. As discussed above, this information may include the geometry of the source array, the number of source elements, the signature of each source element, the volume of each source element. In sub-step 1204, the information about the composite receivers is provided. This information may include the number of individual sensors, the distance between the individual sensors, the position of each individual sensor and/or receiver along the streamer, calibration information, etc.

For a typical marine seismic survey system, the source array includes between 10 and 30 individual guns whereas every composite receiver is the stack of typically 8 individual seismic sensors. The source array may include, instead of or in addition to the guns, vibrational elements. The seismic sensors may include hydrophones, geophones, accelerometers, distributed acoustic sensing using an optical fiber, electromagnetic sensors, gravity sensitive sensors, etc. To correctly model the direct arrival from each gun to each individual seismic receiver, it is necessary to characterize all individual guns, by at least their position in the source array and their signatures, and all individual seismic sensors, by at least their position along the streamer and potentially their calibration.

The information obtained in step 1200 may be received in real time, at the global controller of the vessel that tows the streamers and/or sources, directly from the source array and from the various seismic receivers, or via a communication link (e.g., satellite, radio-frequency, etc.) between the global controller and a land facility of the operator of the seismic survey, and/or from a storage medium that is on board of the vessel. Note that this information is typically available before the seismic survey is started. In one embodiment, it is possible that the global controller, which is in direct communication with the source array and the seismic receivers, pings each element for obtaining the information noted above.

Based on the information obtained in step 1200, the global controller on the vessel, which may be part of the navigation system, is programmed to calculate/estimate in step 1206 the complete geometry of all gun-sensors contributions. The global controller calculates the energy propagating through the water from each gun of the source array to each individual sensor $R_i$ of the composite receiver R. This step calculates not only the direct energy that propagates from the gun to the individual seismic sensor, but also the ghost energy (the energy that is reflected from the water surface before arriving at the individual receiver). These calculations generate not only the amplitude, but also the phase of the waves arriving at the individual sensors. This modeling process takes into account the spherical divergence, surface reflection (ghost) and gun signature for each gun.

Step 1206 includes a sub-step 1208 of receiving, from the other components of the navigation system, navigation information related to the source array and the individual sensors. The navigation information includes the global position of the sources and sensors, obtained from GPS information, compass information, etc., as discussed above with regard to FIG. 4. The navigation information is available at each streamer vessel of a marine seismic survey system. This information may be obtained in real-time as the seismic survey progresses. The calculations performed in step 1206 may be performed during each sail line of a seismic survey. Alternatively, the calculations in step 1206 may be performed at a given time, for example, every few seconds or minutes or hours during the seismic survey. One skilled in the art would understand that these calculations can be performed as often as necessary is deemed by the operator of the survey. In one application, the calculations may be performed a posteriori, i.e., whenever the operator of the survey decides or just before processing the seismic data in a land facility.

Once all energy contributions of the signals recorded by the individual sensors are known in step 1206, the method advances to step 1210, where the calculated energy for every individual sensor is summed to obtain the energy that would be recorded by each composite seismic receiver R.

Prior to comparing the estimated energy calculated in step 1210, for the composite seismic receivers, with the corresponding recorded energy, the method calculates/models in step 1212 the acquisition system effect on the recorded direct arrival data. As previously discussed, this step takes into consideration various factors, which are received in step 1214. The factors that are received in step 1214 may include, for example, information related to the anti-alias filtering and re-sampling of the data. In the particular case of the TopSeis configuration, this step also takes into consideration the clipping introduced by the hardware and potentially, a calibration factor. These factors are received in step 1214 from the acquisition system.

In step 1216, the method compares the estimated positions for the source elements and/or individual sensors with the observed positions of these elements (as noted in FIG. 4). The estimated positions were calculated in step 1212 while the observed positions are received in step 1218. Still in step 1216, the method selects an optimum solution based on quantitative criterion for the mismatch with the observed data.

To compare how correct the estimated positions calculated in step 1212 are relative to the observed positions obtained in step 1218, it is necessary to measure the mismatch between the current direct arrival model and the observed data. To do so, it is possible to use matching attributes like time shift, or nrmse, which is the normalized root mean square envelop, which is given by $$nrmse(x, y) = \frac{\sqrt{\sum_i (x-y)^2}}{\sqrt{\sum_i (x)^2}},$$

rms ratio, which is given by $$\frac{\sqrt{\sum_i (y)^2}}{\sqrt{\sum_i (x)^2}},$$

and each of them is being stored to be used as an objective function for the final selection step.

The method then advances to step 1220, where at least one position of a source element of the source and/or at least one position of an individual seismic sensor of the composite receiver is perturbated. In one application, all the elements of the source array or all the sensors of the composite receiver are perturbed at once, along one given direction, with a given step length. A perturbation should be understood in this embodiment as a change in at least one coordinate (preferred along the inline or cross-line direction, but also possible along the depth direction) by a given amount. This amount varies depending with the scope for which the perturbation is performed. For example, for an initial test or QC phase, large range perturbations around 4 to 5 meters along the sail line direction and 20 meters perpendicular to sail line direction may be used. Then, during the iterative process, random changes may be selected in this range. In some cases, it is possible to use smaller ranges for the perturbation, for example, 1 or 2 meters if it is desired to perform a residual re-positioning after an initial re-positioning.

By adjusting the source and/or sensor positions to test most or all of the possible errors, the method returns to step 1206 each time a perturbation is generated and repeats all the steps back to step 1216. After performing the desired number of perturbations, which can be defined by the operator of the seismic survey, the method advances to step 1222 for selecting the optimum solution. This step is performed by finding the source/sensor positions that produce the best objective function, i.e., the objective function has the minimum or the maximum value for the best solution. In one application, an L2 norm may be used for determining the difference between the estimated position data and the observed data. An example of an objective function F is as follows:

$$f(\text{receiver}) = \Sum_{t=t_i}^{t_f} \|D(t) - \Delta(t)\|^2 \qquad (1),$$

where $D(t)$ is the direct arrival observed/recorded data, and $\Delta(t)$ is the direct arrival model. The sensitivity factor is a scaling property depending only on the sensor trace's location with respect to the source location, so it is a weighting on the individual objective function when extracting the global solution for the entire composite receiver. The objective function f performs a sum for all samples t in a window including the direct arrival and its ghost. This allows the method to extract the optimum position correction for each receiver p that minimizes the function f.

As a result of this step, the method ends up with a positioning solution per each receiver involved (typically 800 to 1,000 for the TopSeis configuration). Extracting the final solution is performed in step 1224 by using statistical methods. For example, to extract the global solution for a receiver, the method performs a statistical extraction of the global position correction $P_{global} = \Sum_{t_r} \alpha(tr) \cdot p(tr)$ by applying a weighed sum to take into account the sensitivity a of each receiver, depending on its location with respect to the source.

All solutions are weighted, see weight $\alpha$ in equation (1) above so that the method can take into account resolution and sensitivity differences. Typically, the weights are different depending on the direction of the residual that the method is trying to extract, the relative position of receivers, the strength and shape of the direct arrival seen by a reflector, and finally by the type of correction, i.e., global, per cable, per source, per gun, or per receiver.

About the sensitivity, note that for the cross-line direction, the best measurements are achieved at minimum offset. The outer streamers are more sensitive than the inner streamers and the streamer just below the top source is almost insensitive. The positive offsets are symmetric relative to the negative offsets. For the inline direction, the best measurements are achieved at larger offset, the inner streamers are more sensitive than the outer streamers and the streamer below the top source is almost insensitive. The positive offsets are antisymmetric relative to the negative offsets. For the depth direction, most of the streamers appear to be insensitive to errors. The streamer just below the source is sensitive only at ultra-small offsets. The sensitivity is symmetric for positive and negative offsets.

The method discussed above may be implemented for each shoot, only for selected shots, or only for given times. The results obtained in step 1224, i.e., the estimated positions of the source elements and/or the individual seismic sensors are used in conjunction with the recorded seismic data for a better positioning of each recorded trace. In this regard, a recorded trace (which includes signals from the hydrophones, geophones, accelerometers, etc.) needs to be positioned, prior to being processed with known seismic methods for generating an image of the surveyed subsurface, where the actual seismic receiver is located. However, as discussed earlier, the observed positions of the seismic sensors lack accuracy, especially for the middle of the streamer, where a top source is placed. Thus, the results of step 1224 are used to correct the observed positions, for associating the recorded traces with the corrected positions.

Figure 13:
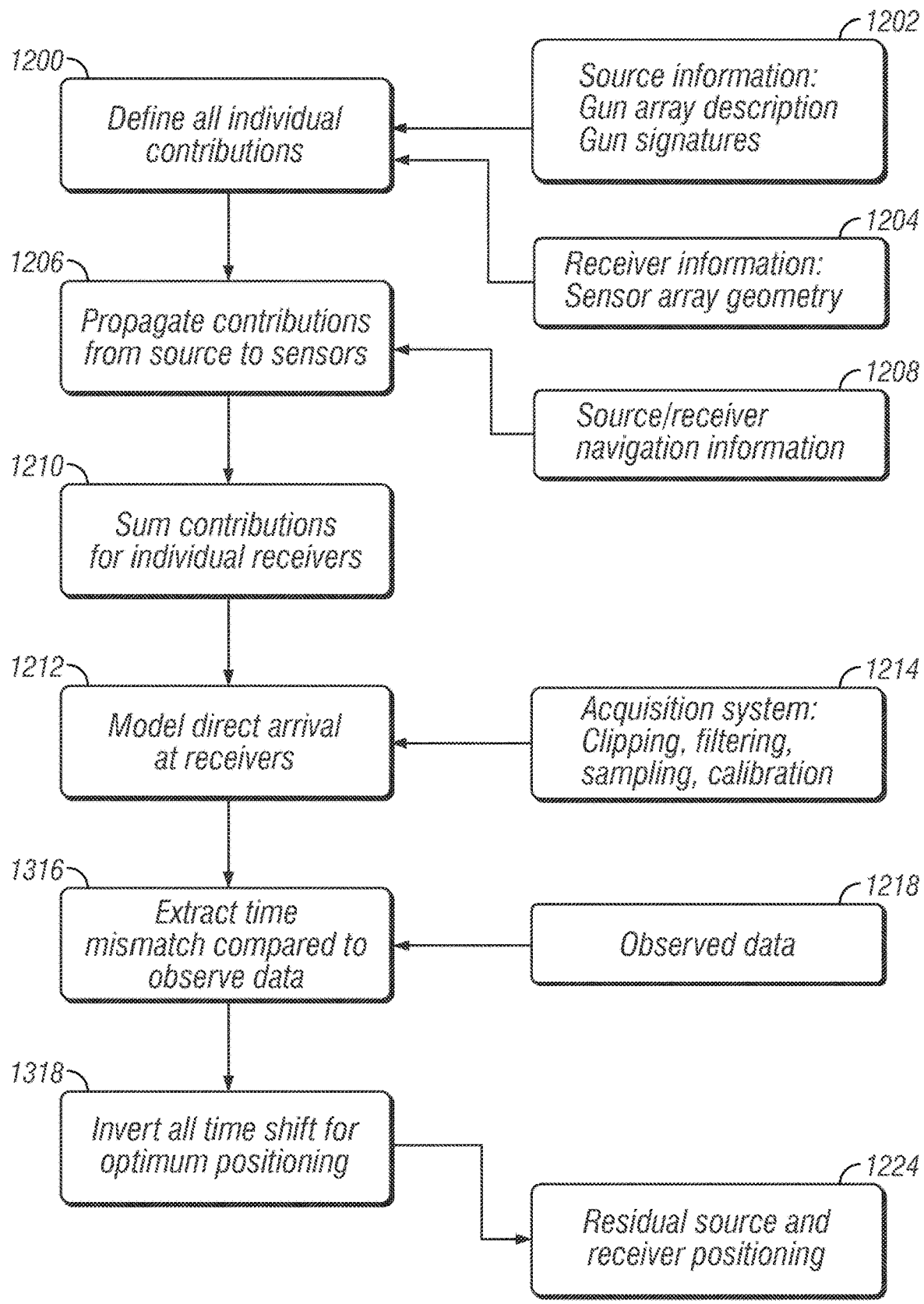
FIG. 13 is a flow chart of another method for correcting positions of individual seismic receivers and/or source elements.

A second implementation of the direct arrival method is now discussed with regard to FIG. 13. The first couple of steps are similar to the corresponding steps of FIG. 12. For this reason, the description of the steps 1200 to 1214, 1218, and 1224 is not repeated herein.

Instead of step 1216, the method of FIG. 13 implements a step 1316 in which an autocorrelation is performed between (i) the estimated data obtained with the direct arrival model in step 1212, and (ii) the observed data received in step 1218. Then, this step extracts a matching quantitative attribute per receiver. This attribute may be a time shift error, an amplitude ratio, nrmse, etc. Then, the method uses this attribute, for example, the time shift error for each receiver, to apply in step 1318 an inversion process to directly find in step 1224 the desired positioning residuals. In one embodiment, any known inversion engine can be used to extract the positioning residuals. In one embodiment, the inversion uses an objective function that is a least square fit of a shifted hyperbola. Other implementations may be used.

The positioning residual is nothing else than the corrected navigation positions of the source array and/or the composite receivers. That is, a revised position for all sources and/or receivers of the acquisition system is produced in step 1224 and these corrected positions best honor the observed data.

The method discussed with regard to FIG. 13 may be implemented for each shot, only for selected shots, or only for given times. The results obtained in step 1224, i.e., the estimated positions of the source elements and the individual seismic receivers are used in conjunction with the recorded seismic data for a better positioning of each recorded trace.

Figure 14A:
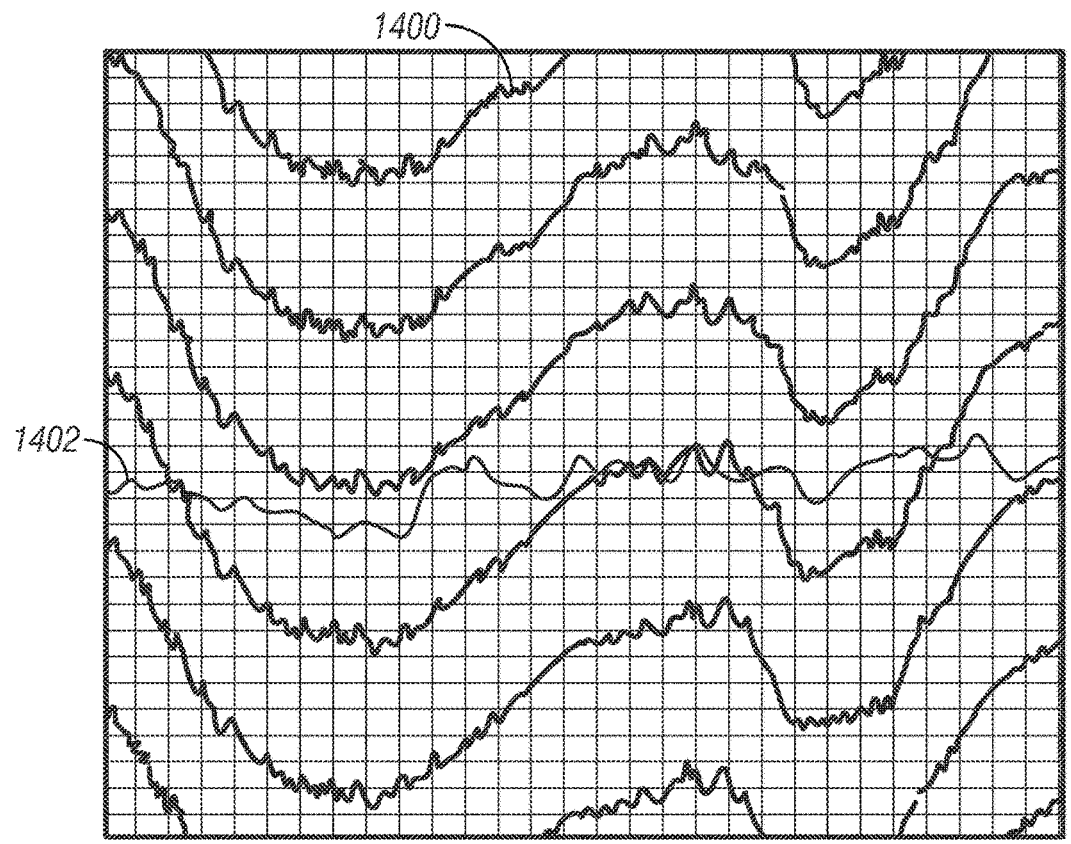
Figure 14B:
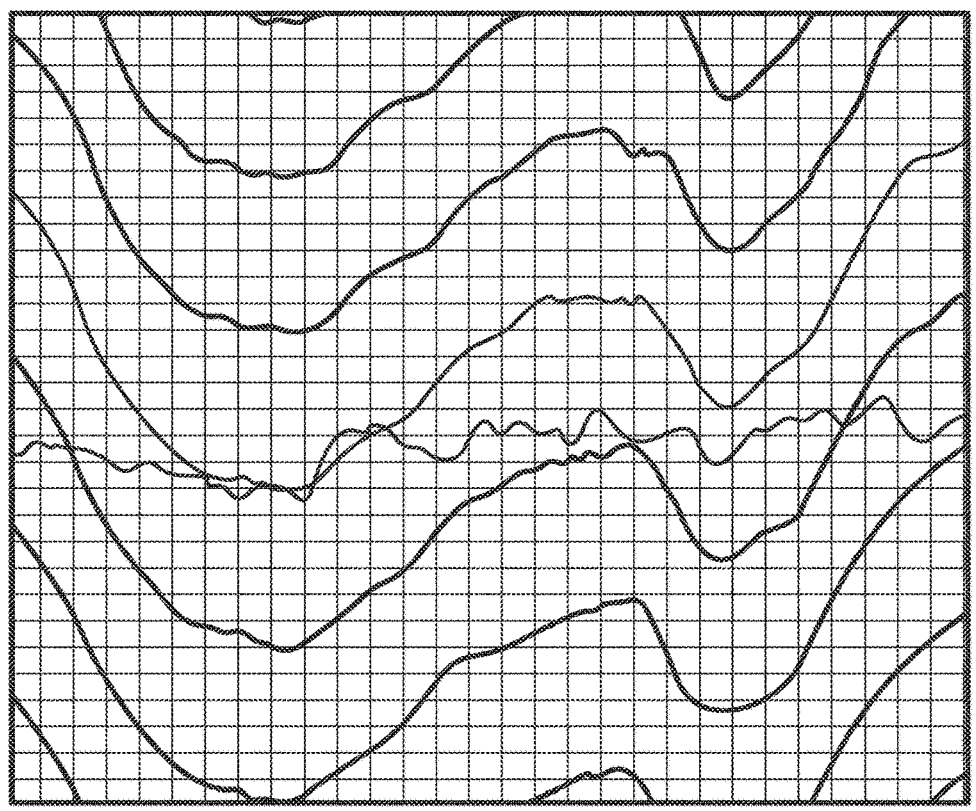
FIG. 14B illustrates corrected positions of the streamer receiver with one of the methods noted above.

FIGS. 14A-14B illustrate how the positions of the sensors and sources are corrected based on the results calculated in step 1224. FIG. 14A shows the trajectories (or successive positions) 1400 of a sensor for each streamer that is towed by the streamer vessel. FIG. 14A also shows the trajectory 1402 of the source. It can be seen in this figure the non-physical position errors, which would imply that in a few seconds, the 6 km long streamer has jumped laterally several meters. After the application of the residual positioning corrections obtained with one of the methods illustrated in FIGS. 12 and 13, it can be observed in FIG. 14B smoother and more realistic trajectories for both the sensors and the source. In these figures, the horizontal direction (sailed line) is compressed by a factor of 100 relative to the transverse dimension for reasons of readability.

Applying the analysis described above, it is possible to extract, for each sensor of a streamer, a calibration curve of the applied errors. The fact that this curve is identical in a first order for the 14 cables of the acquisition device is an additional argument about the robustness for the applied solution.

The above-discussed procedures and methods may be implemented in a computing device as illustrated in FIG. 15. Hardware, firmware, software or a combination thereof may be used to perform the various steps and operations described herein.

Computing device 1500 (which may represent global controller 340) suitable for performing the activities described in the embodiments may include a server 1501. Such a server 1501 may include a central processor (CPU) 1502 coupled to a random access memory (RAM) 1504 and to a read-only memory (ROM) 1506. ROM 1506 may also be other types of storage media to store programs, such as programmable ROM (PROM), erasable PROM (EPROM), etc. Processor 1502 may communicate with other internal and external components through input/output (I/O) circuitry 1508 and bussing 1510 to provide control signals and the like. Processor 1502 carries out a variety of functions as are known in the art, as dictated by software and/or firmware instructions.

Server 1501 may also include one or more data storage devices, including disk drives 1512, CD-ROM drives 1514 and other hardware capable of reading and/or storing information, such as DVD, etc. In one embodiment, software for carrying out the above-discussed steps may be stored and distributed on a CD-ROM or DVD 1516, a removable media 1518 or other form of media capable of portably storing information. These storage media may be inserted into, and read by, devices such as CD-ROM drive 1514, disk drive 1512, etc. Server 1501 may be coupled to a display 1520, which may be any type of known display or presentation screen, such as LCD, plasma display, cathode ray tube (CRT), etc. A user input interface 1522 is provided, including one or more user interface mechanisms such as a mouse, keyboard, microphone, touchpad, touch screen, voice-recognition system, etc.

Server 1501 may be coupled to other devices, such as sources, detectors, etc. The server may be part of a larger network configuration as in a global area network (GAN) such as the Internet 1528, which allows ultimate connection to various landline and/or mobile computing devices.

The disclosed embodiments provide a method that estimates with higher accuracy than the existing methods the positions of the receivers and/or sources for a seismic acquisition system while acquiring seismic data. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a general-purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for correcting observed positions of seismic sensors and/or seismic sources for a seismic data acquisition system, the method comprising:
estimating a source element energy generated by each source element, which belongs to a source array;
estimating a model of direct arrival waves that propagate straight from the source elements to the individual seismic sensors, respectively, the model being based on source modelling for each of the source elements, propagation modelling and characteristics of the seismic data acquisition system related to each of individual seismic sensors of a composite receiver;
for at least two sets of positions among which at least one set of positions is obtained by perturbing at least a position of one of the seismic sensors and/or of the source elements from another of the at least two sets of positions,
calculating direct arrival energies of the direct arrival waves expected to be recorded by each individual seismic sensor and due to each of the source elements, respectively, a direct arrival energy being calculated using
the model,
the estimated source element energy of a respective source element, and
positions of the respective source element within the source array and of a respective individual seismic sensor within the composite receiver according to one of the at least two sets of positions, and
summing, for each individual seismic sensor, the direct arrival energies expected to be recorded from the source elements,
calculating values of an objective function for the at least two sets of positions, each of the values indicating a mismatch between
the direct arrival waves computed using the model for a set of positions among the at least two sets of positions, and
direct arrival waves according to observed seismic data;
selecting a best set of positions among the at least two sets of positions, based on the values of the objective function, the best set of positions corresponding to a lowest value of the objective function; and
correcting one or more of the observed positions of the individual seismic sensors and/or of the source elements according to the best set of positions.

2. The method of claim 1, wherein the characteristics of the acquisition system include clipping a voltage recorded by an individual seismic sensor.

3. The method of claim 1, wherein the characteristics of the acquisition system include filtering a signal recorded by an individual seismic sensor.

4. The method of claim 1, wherein the characteristics of the acquisition system include a sampling of the individual seismic sensor.

5. The method of claim 1, wherein the characteristics of the acquisition system include a calibration of the individual seismic sensor.

6. The method of claim 1,
wherein the model estimates a direct arrival wave due to a source element and reaching a seismic sensor based on
a signature of the source element,
a ghost associated with propagation from the source element to the seismic sensor, and
the estimated source element energy,
to determine an amplitude and a phase of the direct arrival wave.

7. The method of claim 1, wherein for a first one of the at least two sets of positions, the direct arrival energy reaching each individual seismic sensor is calculated by taking into account the position of the individual seismic sensor based on global positioning system, GPS, information recorded by the acquisition system for a head and a tail of a streamer on which the individual seismic sensor is located.

8. The method of claim 1, further comprising:
towing with a streamer vessel the individual seismic sensors along sail lines, and
towing the source array so that the source array is located directly above the individual seismic sensors, along a gravity direction.

9. A computing device for correcting observed positions of seismic sensors and/or seismic sources for a seismic data acquisition system, the computing device comprising:
an interface configured to receive a position of each source element within the source array and a position of each individual seismic sensor within a composite receiver; and
a processor connected to the interface and configured
to estimate a source element energy generated by each source element, which belongs to the source array,
to estimate a model of direct arrival waves that propagate straight from the source elements to the seismic sensors, respectively, the model being based on source modelling, propagation modelling and characteristics of the seismic data acquisition system related to each of individual seismic sensors of a composite receiver,
for at least two sets of positions among which at least one set of positions is obtained by perturbing at least a position of one of the seismic sensors and/or of the source elements from another of the at least two sets of positions,
to calculate direct arrival energies expected to be recorded by each individual seismic sensor and due to each of the source elements of the source array, respectively, a direct arrival energy being calculated using
the model,
the estimated source element energy of a respective source element, and
positions of the respective source element within the source array and of a respective individual seismic sensor within the composite receiver according to one of the at least two sets of positions, and
to sum, for each individual seismic sensor, the direct arrival energies from the source elements,
to calculate values of an objective function for the at least two sets of positions, respectively, each of the values indicating a mismatch between
the direct arrival waves computed using the model of direct arrival waves for a set of positions among the at least two sets of positions, and direct arrival waves according to observed seismic data, to select a best set of positions among the at least two sets of positions based on the values of the objective function, the best set of positions corresponding to a lowest value of the objective function, and to correct one or more of the observed positions of the individual seismic sensors and/or of the source elements according to the best set of positions.

10. A method for correcting observed positions of seismic sensors and/or seismic sources for a seismic data acquisition system, the method comprising:

estimating a source element energy generated by each source element, which belongs to a source array;

estimating a model of direct arrival waves that propagate straight from the source elements to the individual seismic sensors, respectively, the model being based on source modeling, propagation modeling and characteristics of the seismic data acquisition system related to each of individual seismic sensors of a composite receiver;

calculating direct arrival energies of the direct arrival waves expected to be recorded by each individual seismic sensor and due to each source element of the source array, using the model, the estimated source element energy of a source element, an observed position of the source element within the source array and an observed position of a respective individual seismic sensor within the composite receiver;

summing, for each individual seismic sensor, the direct arrival energies from the source elements;

extracting a parameter representing mismatches between the direct arrival waves according to the model and direct arrival waves observed in seismic data recorded by the individual seismic sensors;

applying an inversion process to the parameter for determining one or more positioning residuals for one or more of the individual seismic sensors; and correcting one or more of the observed positions of the individual seismic sensors with the corresponding one or more positioning residuals.

11. The method of claim 10, wherein the parameter is a shift time error between the direct arrival waves according to the model and according to the observed data recorded by the individual seismic sensors.

12. The method of claim 10, further comprising:

applying the inversion for calculating corrected positions of the source elements of the source array.

13. The method of claim 10, wherein the characteristics of the acquisition system include clipping a voltage recorded by an individual seismic sensor.

14. The method of claim 10, wherein the characteristics of the acquisition system include filtering a signal recorded by an individual seismic sensor.

15. The method of claim 10, wherein the characteristics of the acquisition system include a sampling of the individual seismic sensor.

16. The method of claim 10, wherein the characteristics of the acquisition system include a calibration of the individual seismic sensor.

17. The method of claim 10, wherein the model estimates a direct arrival wave due to a source element and reaching a seismic sensor based on a signature of the source element, a ghost associated with propagation from the source element to the seismic sensor, and the estimated direct arrival energy of the source element, to determine an amplitude and a phase of the direct arrival wave, and wherein at least one of the direct arrival energies expected to be recorded by an individual seismic sensor is calculated by taking into account a position of the individual seismic sensor based on global positioning system, GPS, information recorded by the acquisition system for a head and a tail of a streamer on which the individual seismic sensor is located.

18. The method of claim 10, further comprising:

towing with a streamer vessel the individual seismic sensors along sail lines, and towing the source array so that the source array is located directly above the individual seismic sensors, along a gravity direction.

19. A computing device for correcting observed positions of seismic sensors and/or seismic sources for a seismic data acquisition system, the computing device comprising:

an interface configured to receive an observed position of each source element within a source array and an observed position of each individual seismic sensor within a composite receiver; and a processor connected to the interface and configured to estimate a source element energy generated by each source element, which belongs to the source array, to estimate a model of direct arrival waves that propagate straight from the source elements to the seismic sensors, the model being based on source modelling, propagation modelling and characteristics of the seismic data acquisition system related to each individual sensor of a composite receiver to calculate direct arrival energies of the direct arrival waves expected to be recorded by each individual seismic sensor and due to each source element of the source array, using the model, the estimated source element energy, the observed position of the each source element within the source array, the observed position of the each individual seismic sensor within the composite receiver and characteristics of the seismic data acquisition for the each respective individual seismic sensor, to sum, for each seismic sensor, the direct arrival energies from the source elements, to extract a parameter representing mismatches between the direct arrival waves according to the model and direct arrival waves observed in seismic data recorded by the individual seismic sensors, to apply an inversion process to the parameter for determining one or more positioning residuals for one or more of the individual seismic sensors, and to correct one or more of the observed positions of the individual seismic sensors with corresponding one or more positioning residuals.

* * * * *